(12) United States Patent
Koreeda et al.

(10) Patent No.: US 11,249,258 B2
(45) Date of Patent: Feb. 15, 2022

(54) CONNECTOR

(71) Applicant: JAPAN AVIATION ELECTRONICS INDUSTRY, LIMITED, Tokyo (JP)

(72) Inventors: Yuichi Koreeda, Tokyo (JP); Hideto Shimazu, Tokyo (JP); Masaki Ishiguro, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 16/969,595

(22) PCT Filed: Jan. 22, 2019

(86) PCT No.: PCT/JP2019/001817
§ 371 (c)(1),
(2) Date: Aug. 13, 2020

(87) PCT Pub. No.: WO2019/187539
PCT Pub. Date: Oct. 3, 2019

(65) Prior Publication Data
US 2021/0055486 A1 Feb. 25, 2021

(30) Foreign Application Priority Data
Mar. 30, 2018 (JP) .............................. JP2018-068775

(51) Int. Cl.
*G02B 6/38* (2006.01)
*G02B 6/42* (2006.01)
*G02B 6/36* (2006.01)
(52) U.S. Cl.
CPC ............. *G02B 6/3894* (2013.01); *G02B 6/36* (2013.01); *G02B 6/3897* (2013.01); *G02B 6/42* (2013.01); *G02B 6/4292* (2013.01); *G02B 6/3825* (2013.01)

(58) Field of Classification Search
CPC .......... G02B 6/3894; G02B 6/42; G02B 6/36; G02B 6/3825; G02B 6/3897; G02B 6/4292
(Continued)

(56) References Cited

U.S. PATENT DOCUMENTS 8,376,628 B2   2/2013   Koreeda et al.
8,465,311 B2   6/2013   Takamatsu
(Continued)

FOREIGN PATENT DOCUMENTS

CN   103576248 A   2/2014
JP   S52008835 A   1/1977
(Continued)

OTHER PUBLICATIONS

International Search Report (ISR) (and English translation thereof) dated Mar. 19, 2019 issued in International Application No. PCT/JP2019/001817.
(Continued)

*Primary Examiner* — Michael P Mooney
(74) *Attorney, Agent, or Firm* — Holtz, Holtz & Volek PC

(57) ABSTRACT

A connector includes a cable holding portion, a first holding member having a first male screw portion and a first guide portion, an optical connector, an optical module, a second holding member having a second male screw portion and a second guide portion, and a coupling nut having a female screw portion. In cooperation with each other, the first and second guide portions allow a relative movement of the first holding member with respect to the second holding member in the front-rear direction while regulating a relative movement of the first holding member with respect to the second holding member in a circumferential direction about an axis parallel to the front-rear direction. Relative positions of the first holding member and the second holding member in the
(Continued)

front-rear direction are maintained by the female screw portion being meshed with both of the first and the second male screw portions.

11 Claims, 13 Drawing Sheets

(58) Field of Classification Search
USPC .............................................. 385/53, 55, 92
See application file for complete search history.

(56) References Cited

U.S. PATENT DOCUMENTS

| | | |
|---|---|---|
| 10,001,604 B2 | 6/2018 | Koreeda et al. |
| 2005/0041928 A1* | 2/2005 | Zimmel .............. G02B 6/3825 385/55 |
| 2009/0191738 A1* | 7/2009 | Kadar-Kallen ........ G02B 6/389 439/207 |
| 2012/0071019 A1* | 3/2012 | Takamatsu ........... G02B 6/3897 439/370 |
| 2012/0155807 A1 | 6/2012 | Knapp |
| 2014/0029897 A1 | 1/2014 | Shimazu et al. |
| 2014/0199028 A2 | 7/2014 | Shimazu et al. |
| 2017/0139158 A1 | 5/2017 | Coenegracth |

FOREIGN PATENT DOCUMENTS

| | | |
|---|---|---|
| JP | H02100211 U | 8/1990 |
| JP | 2011107513 A | 6/2011 |
| JP | 2011180238 A | 9/2011 |
| JP | 2012068323 A | 4/2012 |
| JP | 2016009011 A | 1/2016 |
| WO | 2016056271 A1 | 4/2016 |

OTHER PUBLICATIONS

Japanese Office Action (and English language translation thereof) dated Mar. 13, 2019 issued in Japanese Application No. 2018-068775.
Written Opinion dated Mar. 19, 2019 issued in International Application No. PCT/JP2019/001817.
Extended European Search Report (EESR) dated Mar. 24, 2021 issued in European Application No. 19774556.5.
Chinese Office Action (and English language translation thereof) dated Jun. 30, 2021, issued in counterpart Chinese Application No. 201980014414.0.
European Office Action dated Nov. 9, 2021, issued in counterpart European Application No. 19774556.5.

* cited by examiner

CONNECTOR

TECHNICAL FIELD

This invention relates to a connector, in particular, to a connector which is used for connecting an optical cable and an electronic equipment with each other.

BACKGROUND ART

Referring to FIGS. 24 and 25, Patent Document 1 discloses a connector 900 which is used for connection with an adaptor 990. The adaptor 990 comprises a mating portion 992 and an optical module 995. An outer circumferential surface of the mating portion 992 is provided with a protrusion 993. The connector 900 comprises a cable 970, a coupling body (cable holding portion) 910, a cylindrical portion 920, an optical connector 930 and an outer tubular portion 960. An optical fiber cable 980, which transmits optical signals, is inserted in the cable 970. The cable holding portion 910 holds the optical fiber cable 980. The cable holding portion 910 is attached with the cylindrical portion 920. The cylindrical portion 920 holds the optical connector 930. The optical connector 930 is attached with the optical fiber cable 980. The optical connector 930 is connected with the optical module 995 when the connector 900 is connected with the adaptor 990. The outer tubular portion 960 is movable within a predetermined range in a front-rear direction (X-direction) with respect to the cylindrical portion 920. The outer tubular portion 960 is formed with a ditch 962. The ditch 962 of the outer tubular portion 960 of the connector 900 is engaged with the protrusion 993 of the mating portion 992 of the adaptor 990 when the connector 900 is connected with the adaptor 990. Accordingly, relative positions of the cylindrical portion 920 of the connector 900 and the mating portion 992 of the adaptor 990 in the front-rear direction (X-direction) are maintained.

PRIOR ART DOCUMENTS

Patent Document(s)

Patent Document 1: JP A 2012-68323

SUMMARY OF INVENTION

Technical Problem

If the connector 900 of Patent Document 1 is modified so that an optical module, which is connected with the optical connector 930, is arranged in the connector 900, the optical fiber cable 980 between an end portion 932 of the optical connector 930 and the cable holding portion 910 is required to have a length which depends on a size in the front-rear direction of the optical module connected therewith. When an optical module having a minimum size in the front-rear direction is replaced with a greater sized optical module in the modified connector 900 whose optical fiber cable 980 between the end portion 932 of the optical connector 930 and the cable holding portion 910 is arranged to have a length which is defined by the optical module having the minimum size in the front-rear direction, the optical fiber cable 980 between the end portion 932 and the cable holding portion 910 has an excess length to be bent so that the optical fiber cable 980 has a problem of increased optical loss.

It is therefore an object of the present invention to provide a connector which prevents an optical fiber cable from having an excess length to be bent in the connector even if an optical module is replaced with another optical module having a different size in a front-rear direction.

Solution to Problem

An aspect of the present invention provides a connector comprising a cable holding portion, a first holding member, an optical connector, an optical module, a second holding member and a coupling nut. The cable holding portion is configured to hold an optical fiber cable which transmits optical signals. The cable holding portion is attached with the first holding member. The first holding member holds the optical connector. The first holding member has a first male screw portion and a first guide portion. The optical connector is configured to be attached with the optical fiber cable. The optical module is connected with the optical connector. The optical module comprises a photoelectric conversion portion and an electrical connector. The second holding member is positioned forward of the first holding member in a front-rear direction. The second holding member holds the optical module. The second holding member has a second male screw portion and a second guide portion. The first guide portion and the second guide portion allow a relative movement of the first holding member with respect to the second holding member in the front-rear direction in cooperation with each other while regulating a relative movement of the first holding member with respect to the second holding member in a circumferential direction about an axis parallel to the front-rear direction in cooperation with each other. The coupling nut has a female screw portion. Relative positions of the first holding member and the second holding member in the front-rear direction are maintained by the female screw portion being meshed with both of the first male screw portion and the second male screw portion.

Advantageous Effects of Invention

The connector of the present invention is configured as follows: the first holding member, which holds the optical connector, has the first male screw portion and the first guide portion; the second holding member, which holds the optical module, has the second male screw portion and the second guide portion; the coupling nut has the female screw portion; the first guide portion and the second guide portion cooperate with each other to allow the relative movement of the first holding member with respect to the second holding member in the front-rear direction while cooperating with each other to regulate the relative movement of the first holding member with respect to the second holding member in the circumferential direction about the axis parallel to the front-rear direction; and the relative positions of the first holding member and the second holding member in the front-rear direction are maintained by the female screw portion being meshed with both of the first male screw portion and the second male screw portion. Accordingly, the optical fiber cable can have a constant length between the optical connector and the cable holding portion so that the optical fiber cable can be prevented from having an excess length to be bent in the connector even if the optical module is replaced with another optical module having a different size in the front-rear direction.

An appreciation of the objectives of the present invention and a more complete understanding of its structure may be had by studying the following description of the preferred embodiment and by referring to the accompanying drawings.

DESCRIPTION OF EMBODIMENTS

Figure 1:
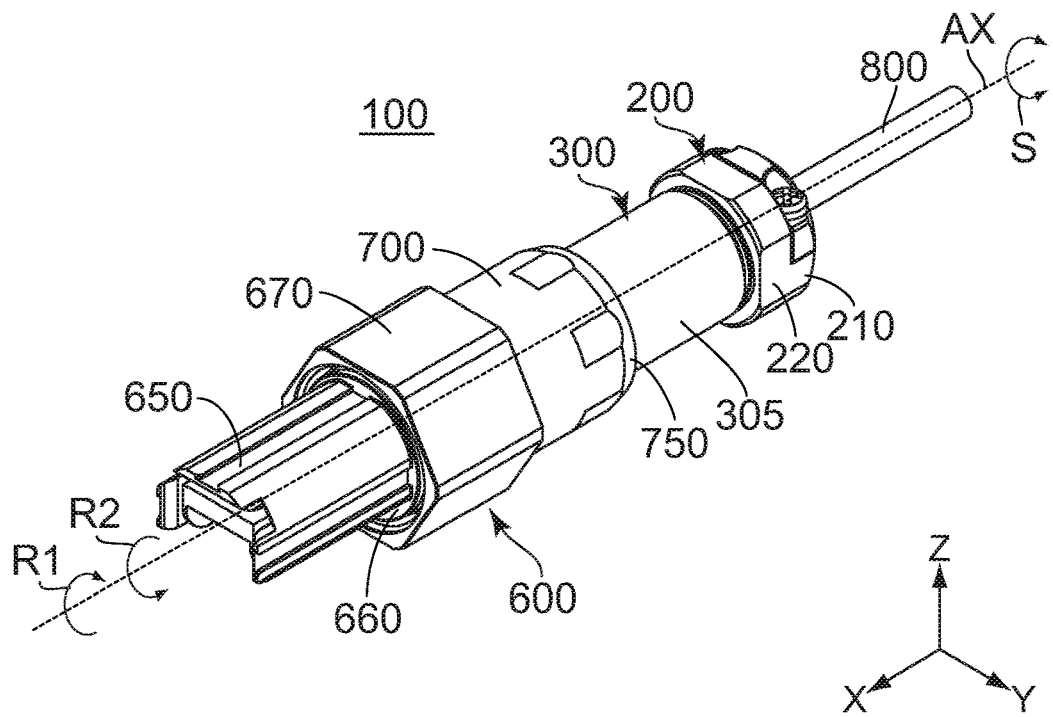
FIG. 1 is a perspective view showing a connector according to an embodiment of the present invention. In the figure, a female screw portion of a coupling nut is meshed with both of a first male screw portion of a first holding member and a second male screw portion of a second holding member.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Figure 2:
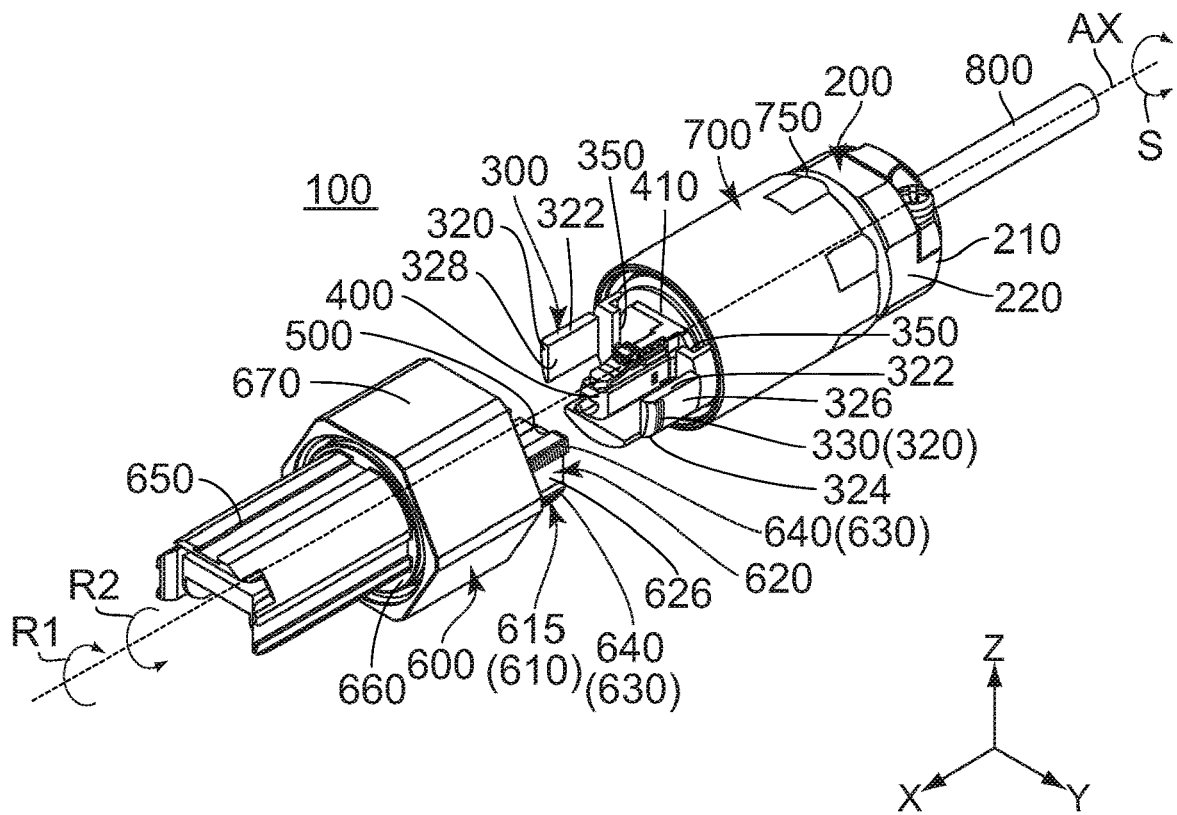
FIG. 2 is an exploded, perspective view showing the connector of FIG. 1. In the figure, the female screw portion of the coupling nut is not meshed with any of the first male screw portion of the first holding member and the second male screw portion of the second holding member. In addition, an optical module is held by the second holding member and is not connected with an optical connector.

As shown in FIG. 2, a connector 100 according to an embodiment of the present invention comprises a cable holding portion 200, a first holding member 300, an optical connector 400, an optical module 500, a second holding member 600 and a coupling nut 700.

Figure 16:
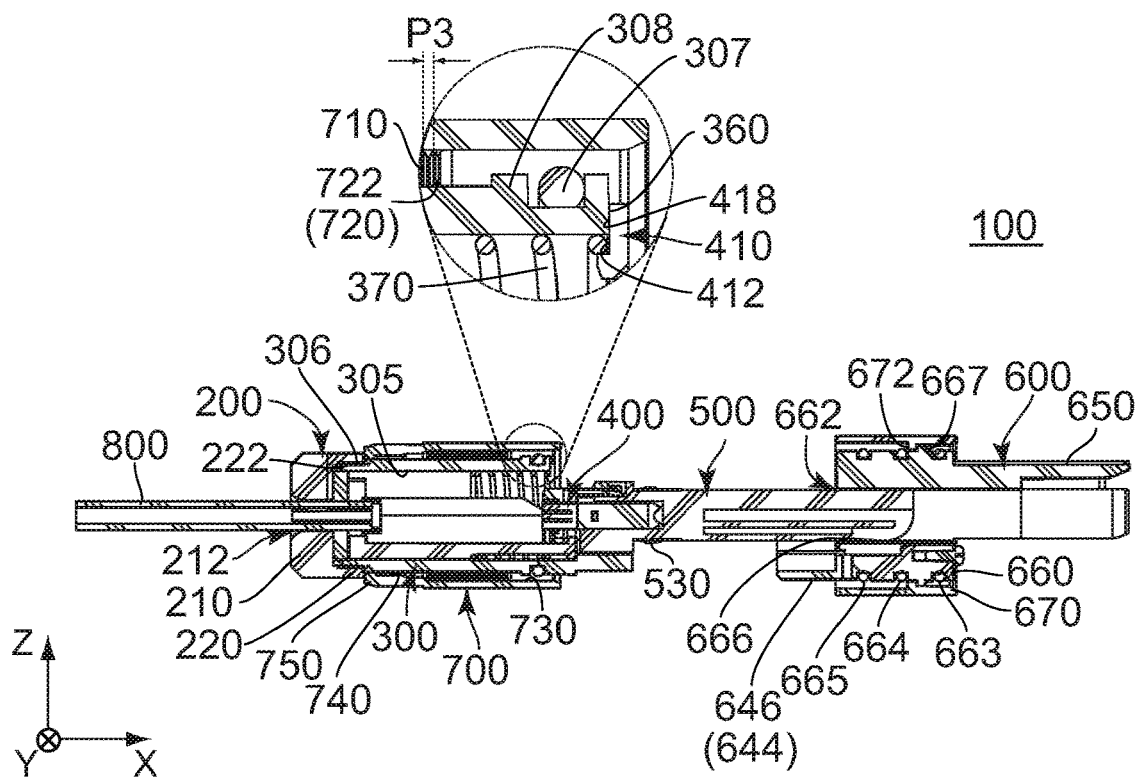
FIG. 16 is a cross-sectional view showing the connector of FIG. 15, taken along line A-A. In the figure, the first holding member and the coupling nut are partially enlarged.

As shown in FIG. 1, the cable holding portion 200 of the present embodiment is positioned rearward of the first holding member 300 in a front-rear direction. A rear end of the cable holding portion 200 is a rearmost end of the connector 100. As shown in FIG. 16, the cable holding portion 200 holds an optical fiber cable 800 which transmits optical signals. In the present embodiment, the front-rear direction is an X-direction. Specifically, it is assumed that forward is a positive X-direction while rearward is a negative X-direction.

Figure 8:
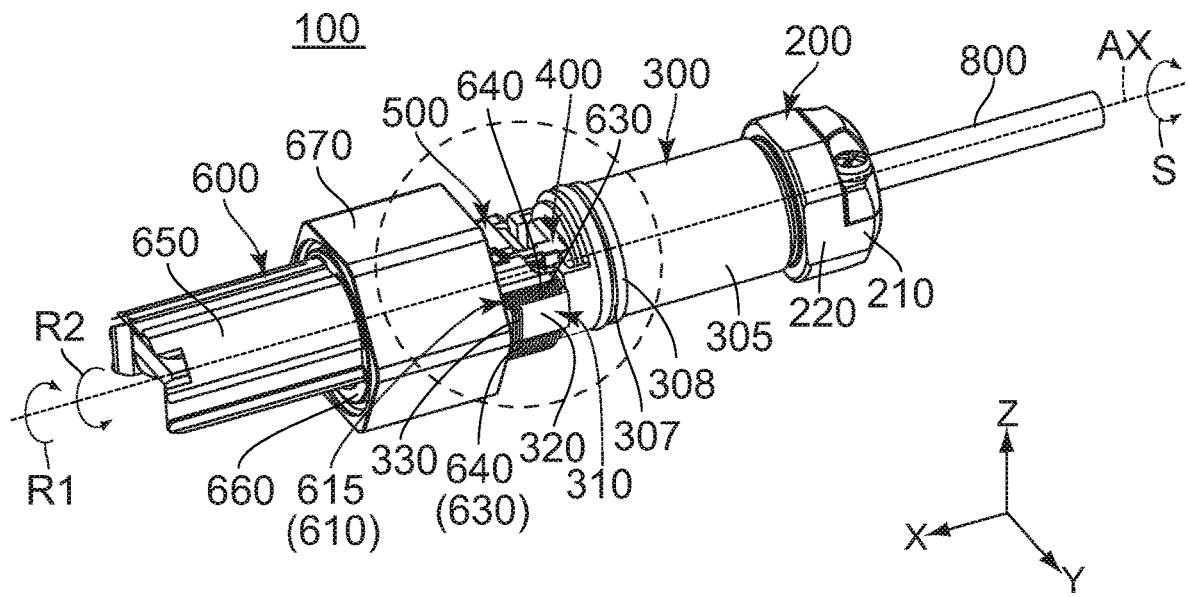
FIG. 8 is a perspective view showing a state where the connector of FIG. 3 arrives and where protruding pieces of a first guide portion of the first holding member are inserted into ditches, respectively, of a second guide portion of the second holding member. In the figure, the coupling nut is omitted.

As shown in FIGS. 1 and 8, the cable holding portion 200 of the present embodiment has a disc-like portion 210 and a tube portion 220.

As shown in FIGS. 8 and 16, the disc-like portion 210 of the present embodiment has a substantially discoid shape which is centered on an axis AX parallel to the front-rear direction. The disc-like portion 210 has a hole 212 which pierces the disc-like portion 210 in the front-rear direction. The disc-like portion 210 is positioned rearward of the tube portion 220 in the front-rear direction. More specifically, a front end of the disc-like portion 210 is coupled with a rear end of the tube portion 220 in the front-rear direction. The optical fiber cable 800 is held by the cable holding portion 200 so as to pass through the hole 212 of the disc-like portion 210 of the cable holding portion 200.

As shown in FIGS. 8 and 16, the tube portion 220 of the present embodiment has a shape which is rotationally symmetric with respect to the axis AX. More specifically, the tube portion 220 has a polygonal tubular shape which is centered on the axis AX and which extends in the front-rear direction. An inner wall of the tube portion 220 is provided with a female screw 222.

As shown FIGS. 8 and 16, the first holding member 300 of the present embodiment holds the optical connector 400. More specifically, the first holding member 300 holds the optical connector 400 so that the optical connector 400 is movable in the front-rear direction.

As shown in FIG. 8, the first holding member 300 of the present embodiment has a first cylindrical portion 305, a first guide portion 310 and first male screw portions 330.

As shown in FIGS. 2, 8 and 16, the first cylindrical portion 305 of the present embodiment has a substantially cylindrical shape which is centered on the axis AX and which extends in the front-rear direction. The first cylindrical portion 305 has front regulating portions 350, a rear regulating portion 360, an O-ring 307, a first protrusion 308 and a male screw 306. In other words, the first holding member 300 has the front regulating portions 350 and the rear regulating portion 360.

Figure 9:
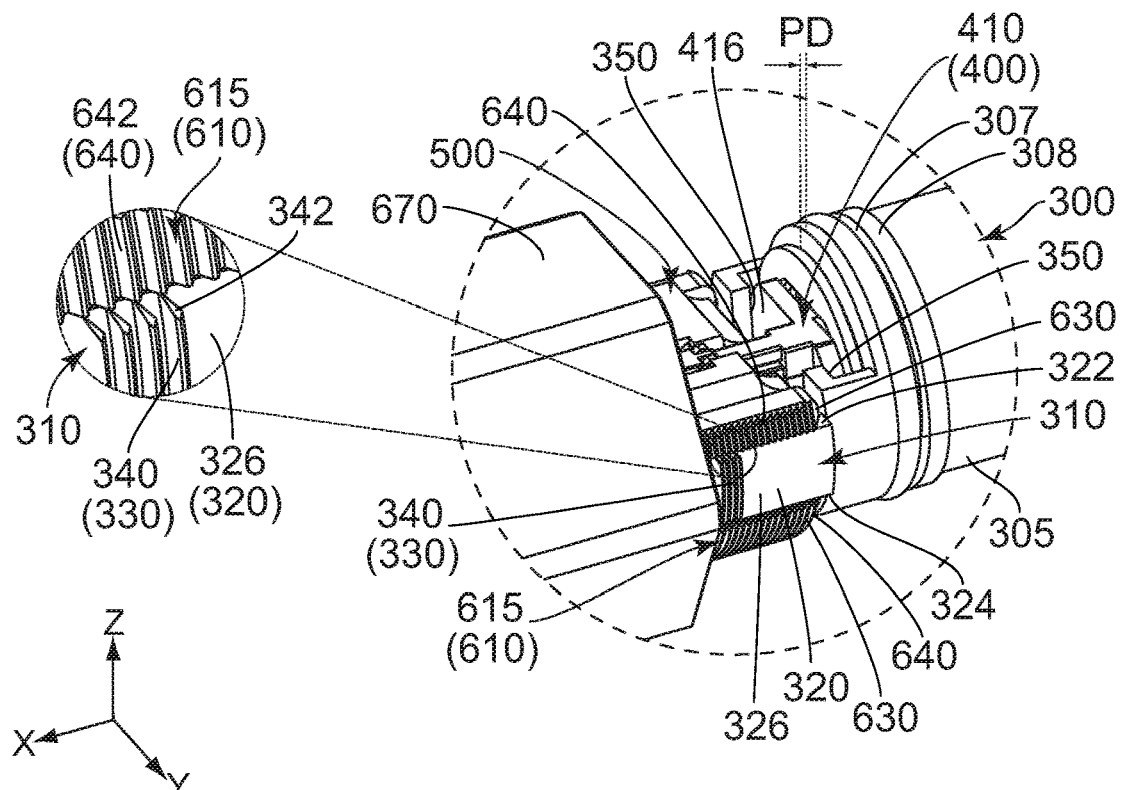
FIG. 9 is a partially enlarged, perspective view showing the connector of FIG. 8. In the figure, the first male screw portion and the second male screw portion are further partially enlarged.

As shown in FIGS. 2 and 9, each of the front regulating portions 350 of the present embodiment is positioned at a front end of the first cylindrical portion 305 in the front-rear direction. Each of the front regulating portions 350 protrudes inward in a radial direction perpendicular to the axis AX. More specifically, each of the front regulating portions 350 protrudes inward in a lateral direction perpendicular to the front-rear direction. In the present embodiment, the lateral direction is a Y-direction.

As shown in FIG. 16, the rear regulating portion 360 of the present embodiment is positioned around the front end of the first cylindrical portion 305. Referring to FIGS. 2 and 16, the rear regulating portion 360 is positioned rearward of the front regulating portion 350 in the front-rear direction. The rear regulating portion 360 is positioned forward of the O-ring 307 in the front-rear direction. The rear regulating portion 360 is a plane facing forward in the front-rear direction.

Referring to FIG. 16, the O-ring 307 of the present embodiment has an annular shape which is centered on the axis AX. The O-ring 307 is arranged on an outer circumferential surface of the first cylindrical portion 305. The O-ring 307 is arranged around the front end of the first cylindrical portion 305. The O-ring 307 is positioned between the rear regulating portion 360 and the first protrusion 308 in the front-rear direction. Specifically, the O-ring 307 is positioned rearward of the rear regulating portion 360 and forward of the first protrusion 308.

As shown in FIG. 16, the first protrusion 308 of the present embodiment protrudes outward in the radial direction from the outer circumferential surface of the first cylindrical portion 305. The first protrusion 308 is positioned between the O-ring 307 and the male screw 306 in the front-rear direction. Specifically, the first protrusion 308 is positioned rearward of the O-ring 307 and forward of the male screw 306.

As shown in FIG. 16, the male screw 306 of the present embodiment is positioned at a rear end of the first cylindrical portion 305. The male screw 306 is screwed into the female screw 222 of the tube portion 220 of the cable holding portion 200. In other words, the cable holding portion 200 is attached with the first holding member 300.

As shown in FIGS. 2 and 9, the first guide portion 310 of the present embodiment extends forward in the front-rear direction from the front end of the first cylindrical portion 305. The first guide portion 310 comprises two protruding pieces 320. Each of the protruding pieces 320 extends forward in the front-rear direction. Each of the protruding pieces 320 has a rectangular shape when viewed in the lateral direction. Each of the protruding pieces 320 has an upper surface 322 and a lower surface 324. The upper surface 322 is perpendicular to an up-down direction. The lower surface 324 is perpendicular to the up-down direction. In the present embodiment, the up-down direction is a Z-direction. It is assumed that upward is a positive Z-direction while downward is a negative Z-direction. Each of the protruding pieces 320 has an outer surface 326 and an inner surface 328. The outer surface 326 faces outward in the lateral direction. The inner surface 328 faces inward in the lateral direction. The inner surface 328 of the protruding piece 320 is positioned outward of the front regulating portion 350 of the first cylindrical portion 305 in the lateral direction. However, the present invention is not limited thereto. But, the first guide portion 310 should comprise at least one of the protruding piece 320 which extends forward in the front-rear direction.

Figure 10:
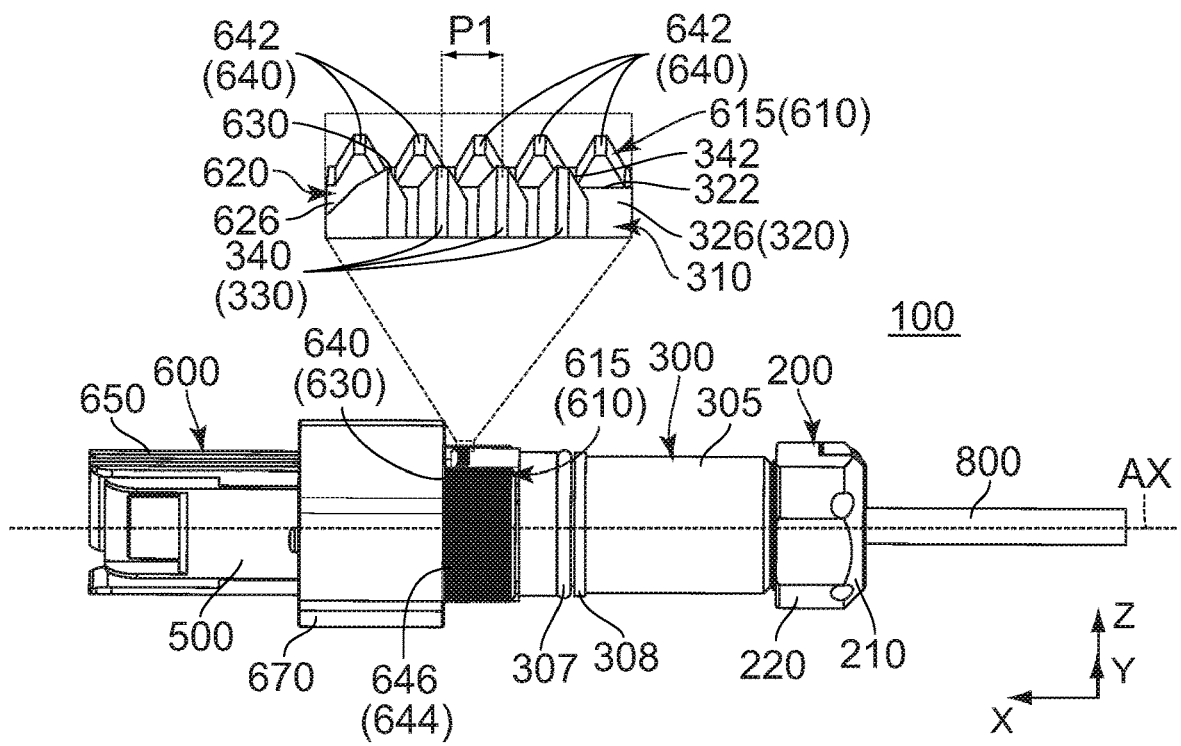
FIG. 10 is a view showing the connector of FIG. 8. In the figure, the first male screw portion and the second male screw portion are partially enlarged.
Figure 11:
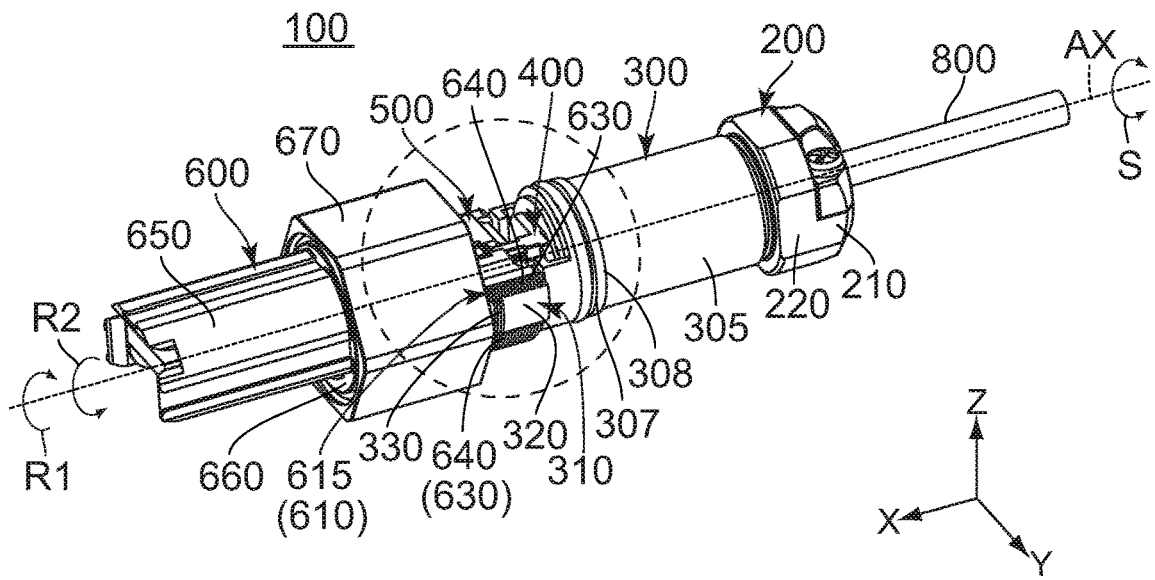
FIG. 11 is another perspective view showing a state where the connector of FIG. 3 arrives and where the protruding pieces of the first guide portion of the first holding member are inserted into the ditches, respectively, of the second guide portion of the second holding member. In the figure, the coupling nut is omitted.
Figure 12:
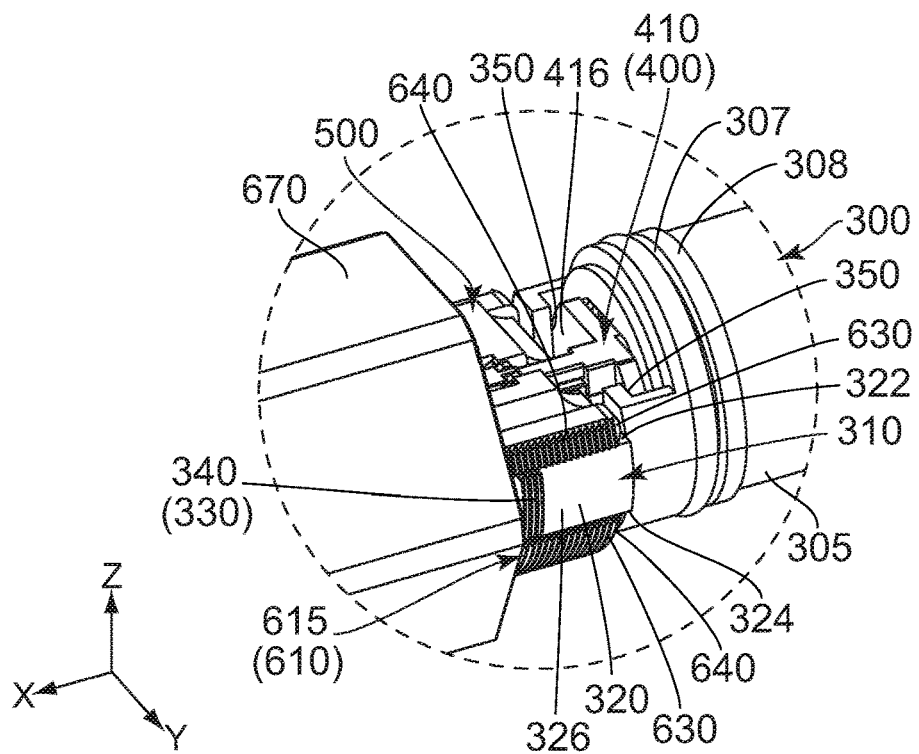
FIG. 12 is a partially enlarged, perspective view showing the connector of FIG. 11.

As shown in FIGS. 2 and 9, the first male screw portions 330 of the present embodiment are provided on the protruding pieces 320, respectively, of the first guide portion 310. More specifically, the first male screw portion 330 is provided on the outer surface 326 of the protruding piece 320, and screw threads 340 of the first male screw portion 330 protrude outward in the lateral direction. Referring to FIGS. 8 to 10, the first male screw portion 330 has the screw threads 340. The screw thread 340 of the first male screw portion 330 has an intersecting surface 342. The intersecting surface 342 is positioned at an end of the screw thread 340 of the first male screw portion 330 in a second rotation direction R2 of a circumferential direction S about the axis AX. The intersecting surface 342 intersects with a first rotation direction R1. The first rotation direction R1 is opposite to the second rotation direction R2. In other words, the second rotation direction R2 is opposite to the first rotation direction R1. More specifically, the intersecting surface 342 is inclined so as to extend forward and upward. The screw threads 340 of the first male screw portion 330 are arranged at pitches P1 in the front-rear direction. In the present embodiment, the first rotation direction R1 is a clockwise direction when the connector 100 is viewed from its front, while the second rotation direction R2 is a counterclockwise direction when the connector 100 is viewed from its front.

As shown in FIG. 16, the first holding member 300 further comprises a pressing member 370. The pressing member 370 is a spring member 370 which is accommodated in the first holding member 300. More specifically, the spring member 370 is accommodated into the first cylindrical portion 305 of the first holding member 300. The spring member 370 of the present embodiment is a coil spring extending in the front-rear direction.

Referring to FIGS. 2 and 16, the optical connector 400 of the present embodiment connects the optical fiber cable 800 and the optical module 500 with each other. Specifically, the optical connector 400 is attached with the optical fiber cable 800, and the optical connector 400 is attachable with and detachable from the optical module 500.

As shown in FIGS. 2 and 9, the optical connector 400 of the present embodiment is held around the front end of the first cylindrical portion 305 of the first holding member 300. A front end of the optical connector 400 is positioned forward beyond the front end of the first cylindrical portion 305 of the first holding member 300. The optical connector 400 is positioned between the two protruding pieces 320 of the first holding member 300 in the lateral direction perpendicular to both the front-rear direction and the up-down direction. A connecting part of the optical connector 400 and the optical module 500 is positioned forward of the first cylindrical portion 305 of the first holding member 300 in the front-rear direction.

Figure 6:
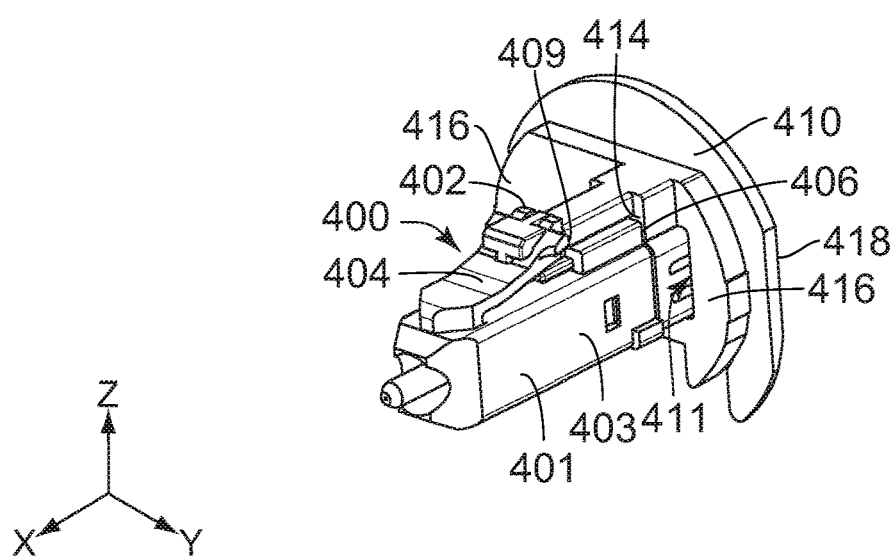
FIG. 6 is a perspective view showing the optical connector which is included in the connector of FIG. 2.

As shown in FIG. 6, the optical connector 400 of the present embodiment has an optical connector main 401 and an extending portion 410. The extending portion 410 is perpendicular to the front-rear direction.

Figure 7:
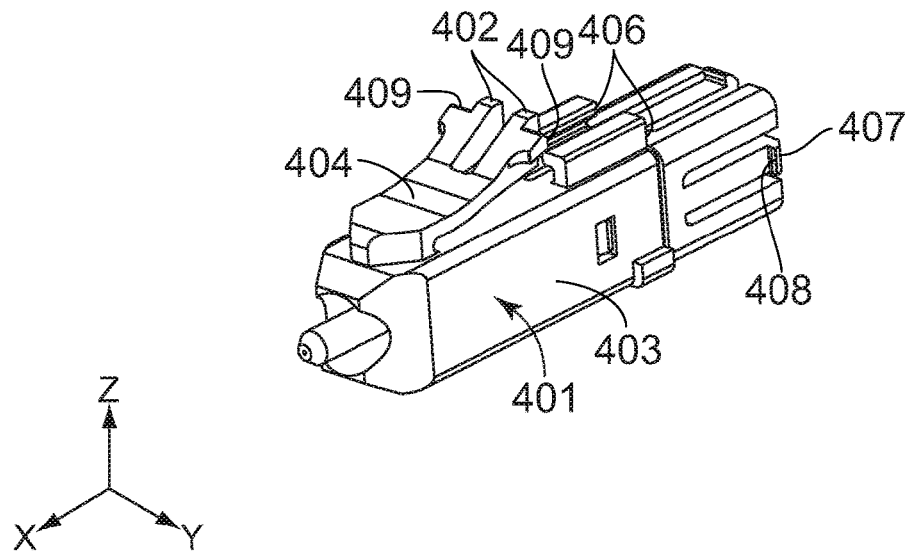
FIG. 7 is a perspective view showing an optical connector main which is included in the optical connector of FIG. 6.

As shown in FIG. 7, the optical connector main 401 of the present embodiment has an optical fiber cable accommodating portion 403, receiving portions 406, hook portions 407, a supporting portion 404, pressed portions 402 and engaging portions 409.

As shown in FIG. 7, the optical fiber cable accommodating portion 403 has a substantially rectangular tube shape extending in the front-rear direction.

As shown in FIG. 7, each of the receiving portions 406 of the present embodiment is provided around a middle of an upper surface of the optical fiber cable accommodating portion 403 in the front-rear direction. Each of the receiving portions 406 is a rear surface of a protrusion which protrudes upward in the up-down direction.

As shown in FIG. 7, each of the hook portions 407 of the present embodiment is positioned at a rear end of the optical fiber cable accommodating portion 403 in the front-rear direction. Each of the hook portions 407 has a hook-like shape which protrudes outward in the radial direction. Each of the hook portions 407 has a front surface 408 facing forward in the front-rear direction. Each of the hook portions 407 is movable in the radial direction.

As shown in FIG. 7, the supporting portion 404 of the present embodiment extends rearward and upward from a front end of the upper surface of the optical fiber cable accommodating portion 403. The supporting portion 404 is supported by the optical fiber cable accommodating portion 403 in a cantilever manner. The supporting portion 404 is elastically deformable.

As shown in FIG. 7, each of the pressed portions 402 of the present embodiment is positioned at an upper, rear end of the supporting portion 404.

As shown FIG. 7, each of the engaging portions 409 of the present embodiment is a plane intersecting with the front-rear direction. Each of the engaging portions 409 is positioned in the vicinity of a rear end of the supporting portion 404. Since the supporting portion 404 is elastically deformable as described above, each of the engaging portions 409 is movable in the up-down direction. Specifically, when the pressed portions 402 are pressed from above, the supporting portion 404 is elastically deformed so that the engaging portions 409 are moved downward. When the pressing against the pressed portions 402 is stopped, the supporting portion 404 restores its original shape so that the engaging portions 409 are moved upward to return to their original positions.

As shown in FIG. 6, the extending portion 410 of the present embodiment is positioned around a rear end of the optical connector 400 in the front-rear direction. In the radial direction, an outer circumference of the extending portion 410 defines an outermost circumference of the optical connector 400.

As shown in FIGS. 6 and 16, the extending portion 410 of the present embodiment has a hole 411, a rear surface 412, an abutting portion 414, front regulated portions 416 and a rear regulated portion 418. The rear surface 412 faces rearward in the front-rear direction. The abutting portion 414 faces forward in the front-rear direction.

As shown in FIG. 6, the hole 411 pierces the extending portion 410 in the front-rear direction. Referring to FIG. 16, the rear surface 412 is a plane perpendicular to the front-rear direction. Referring to FIG. 6 again, the abutting portion 414 is a plane perpendicular to the front-rear direction. Each of the front regulated portions 416 is a plane perpendicular to the front-rear direction. Each of the front regulated portions 416 is positioned rearward of the abutting portion 414 in the front-rear direction. The rear regulated portion 418 is a plane perpendicular to the front-rear direction. The rear regulated portion 418 is positioned rearward of the front regulated portion 416 in the front-rear direction. Referring to FIG. 16 again, the rear regulated portion 418 is positioned outward of the rear surface 412 in the radial direction. The rear surface 412 and the rear regulated portion 418 are positioned on a common plane perpendicular to the front-rear direction.

Referring to FIGS. 9 and 16, the extending portion 410 of the present embodiment is positioned between the front regulating portion 350 and the rear regulating portion 360 of the first cylindrical portion 305 of the first holding member 300 in the front-rear direction. Specifically, in the front-rear direction, the extending portion 410 is positioned rearward of the front regulating portion 350 and forward of the rear regulating portion 360. The front regulated portions 416 of the extending portion 410 face the front regulating portions 350, respectively, of the first cylindrical portion 305 of the first holding member 300 in the front-rear direction. The rear regulated portion 418 of the extending portion 410 faces the rear regulating portion 360 of the first cylindrical portion 305 of the first holding member 300 in the front-rear direction. The extending portion 410 is movable by a predetermined distance PD between the front regulating portion 350 and the rear regulating portion 360 of the first cylindrical portion 305 of the first holding member 300. Specifically, the first holding member 300 is movable forward by the predetermined distance PD with respective to the optical connector 400. The spring member 370 of the first holding member 300 presses the extending portion 410 forward in the front-rear direction. More specifically, the spring member 370 of the first holding member 300 pushes the rear surface 412 of the extending portion 410 to press the front regulated portions 416 of the extending portion 410 against the front regulating portions 350, respectively, of the first cylindrical portion 305 of the first holding member 300. Specifically, the first holding member 300 further comprises the pressing member 370 which presses the extending portion 410 of the optical connector 400 against the front regulating portions 350.

As understood from FIGS. 6 and 7, the extending portion 410 of the present embodiment is held between the receiving portion 406 and the front surface 408 of the hook portion 407 of the optical connector main 401. The receiving portion 406 of the optical connector main 401 faces the abutting portion 414 of the extending portion 410 in the front-rear direction.

Figure 4:
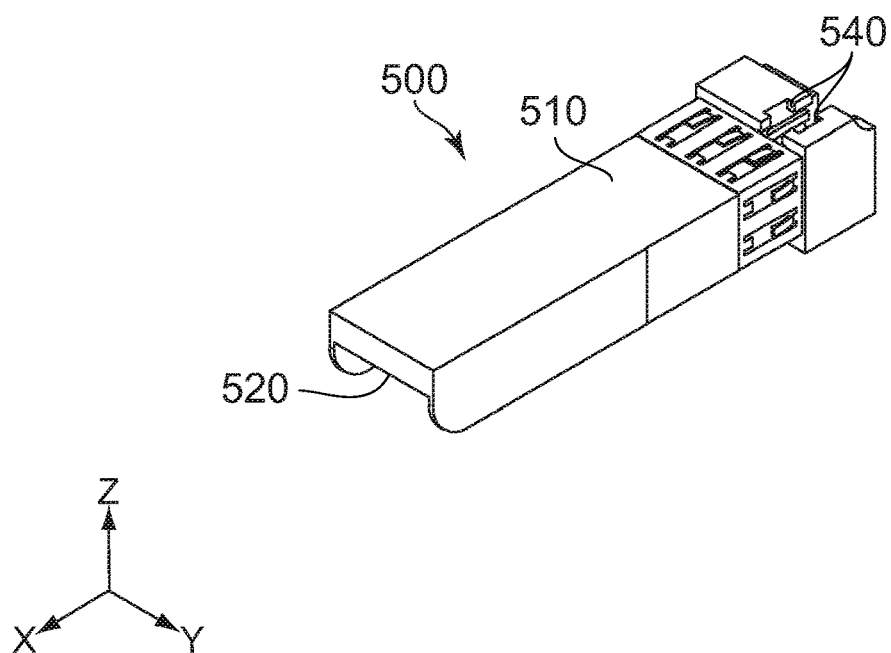
FIG. 4 is a perspective view showing the optical module which is included in the connector of FIG. 3.

Referring to FIGS. 4 and 16, the optical module 500 of the present embodiment is an SFP (Small Form-factor pluggable) module. Specifically, the optical module 500 sends optical signals to the optical connector 400 and receives optical signals from the optical connector 400.

As shown in FIGS. 4 and 16, the optical module 500 of the present embodiment comprises an electrical connector 520, a photoelectric conversion portion 510, locked portions 530 and engaged portions 540.

Referring to FIGS. 4 and 16, the electrical connector 520 sends electrical signals to the photoelectric conversion portion 510 and receives electrical signals from the photoelectric conversion portion 510. The photoelectric conversion portion 510 converts optical signals to electrical signals and vice versa between the optical connector 400 and the electrical connector 520. Each of the locked portions 530 protrudes downward in the up-down direction. Each of the engaged portions 540 is a plane facing forward. Each of the engaged portions 540 is positioned around a rear end of the optical module 500.

Figure 3:
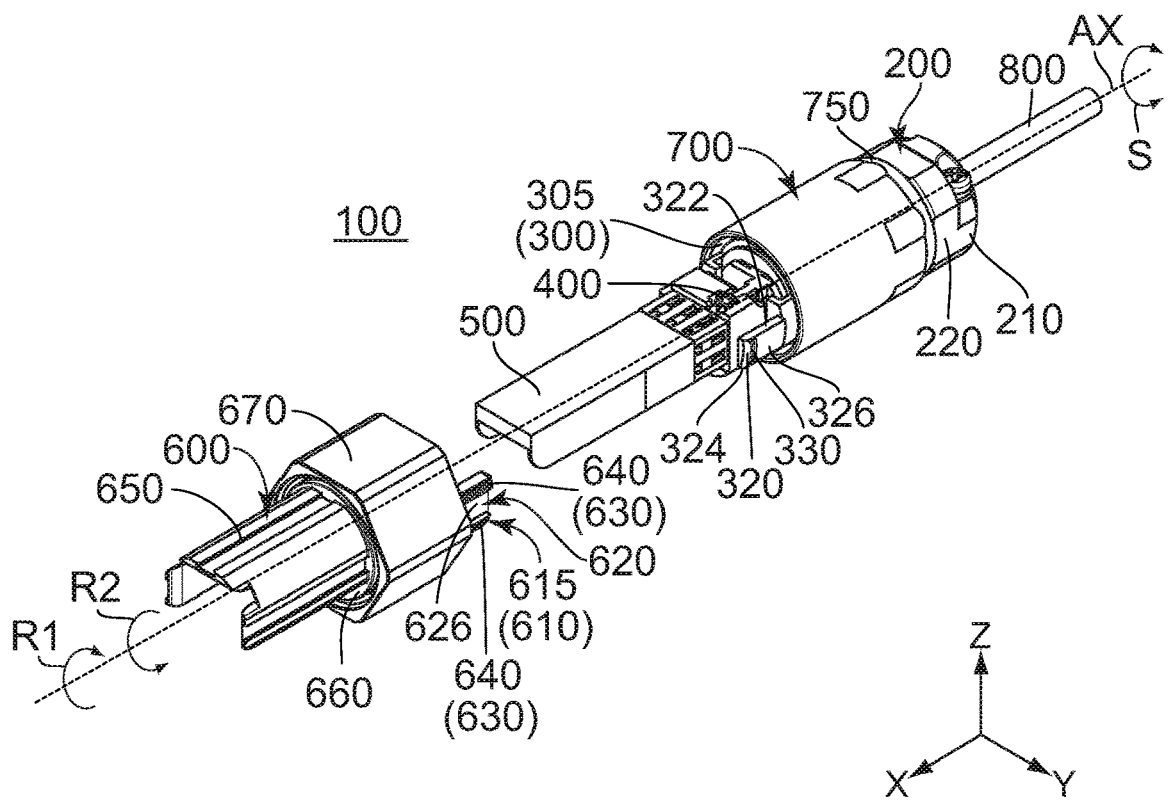
FIG. 3 is another exploded, perspective view showing the connector of FIG. 1. In the figure, the optical module is connected with the optical connector.

As shown in FIGS. 3 and 16, the optical module 500 of the present embodiment is connected with the optical connector 400. The engaged portions 540 (see FIG. 4) of the optical module 500 are positioned rearward of the engaging portions 409 (see FIG. 7), respectively, of the optical connector 400 in the front-rear direction. Specifically, the engaged portions 540 of the optical module 500 face the engaging portions 409, respectively, of the optical connector 400 in the front-rear direction. The optical module 500 is replaceable in the connector 100 of the present embodiment. A method of replacing the optical module 500 is described later.

As shown in FIG. 1, the second holding member 600 of the present embodiment is positioned forward of the first holding member 300 in the front-rear direction. A front end of the second holding member 600 is a frontmost end of the connector 100.

Figure 15:
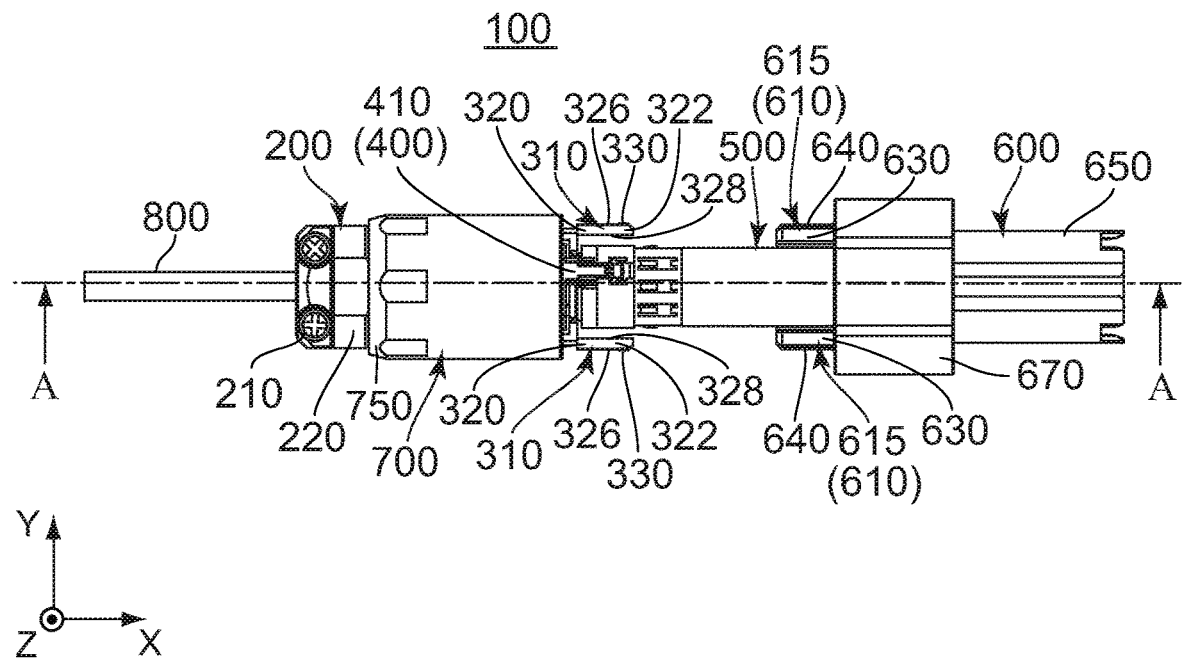
FIG. 15 is a top view showing the connector of FIG. 14.

As shown in FIGS. 15 and 16, the second holding member 600 of the present embodiment has a cover portion 650, a second cylindrical portion 660, a second guide portion 610, second male screw portions 640, a third male screw portion 644 and an outer tubular portion 670.

As shown in FIGS. 1 to 3, the cover portion 650 of the present embodiment has a substantially rectangular half-tube shape. The substantially rectangular half-tube shape of the cover portion 650 extends in the front-rear direction and opens downward. The cover portion 650 is positioned forward of the second cylindrical portion 660 in the front-rear direction. Specifically, a rear end of the cover portion 650 is coupled with a front end of the second cylindrical portion 660 in the front-rear direction.

Figure 5:
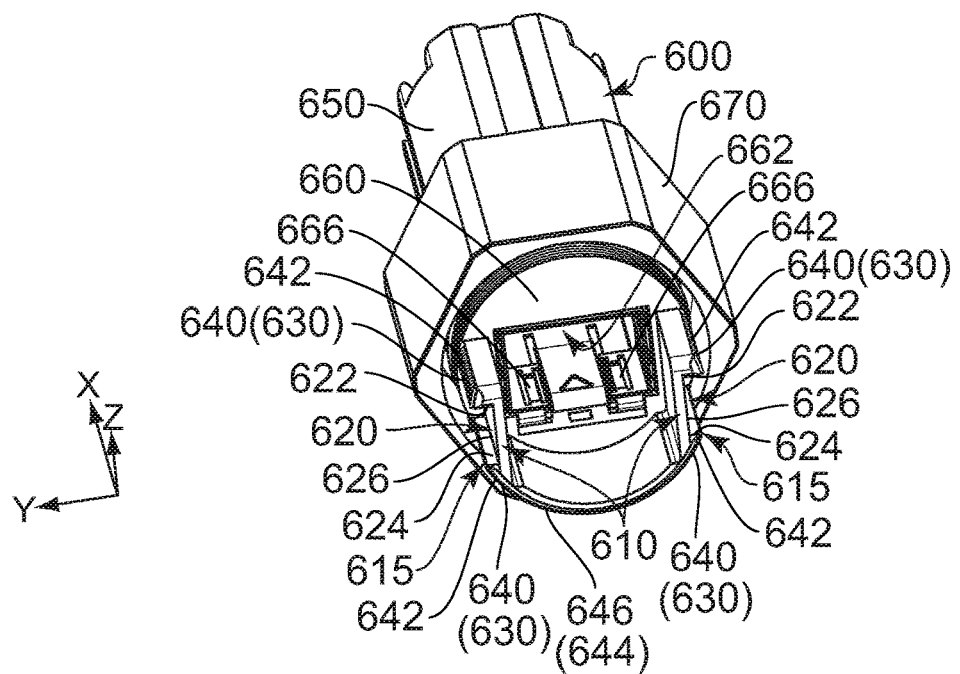
FIG. 5 is a perspective view showing the second holding member which is included in the connector of FIG. 3.

As understood from FIGS. 3 and 5, the second cylindrical portion 660 of the present embodiment has a shape which is rotationally symmetric with respect to the axis AX. More specifically, the second cylindrical portion 660 of the present embodiment has a cylindrical shape which is centered on the axis AX and which extends in the front-rear direction. As shown in FIG. 8, the connecting part of the optical connector 400 and the optical module 500 is positioned rearward of the second cylindrical portion 660 in the front-rear direction. Specifically, the connecting part of the optical connector 400 and the optical module 500 is positioned between the first cylindrical portion 305 of the first holding member 300 and the second cylindrical portion 660 of the second holding member 600 in the front-rear direction.

As shown in FIG. 16, the second cylindrical portion 660 of the present embodiment has an accommodating portion 662, three O-rings 663, 664 and 665, locking portions 666 and a second protrusion 667.

As shown in FIG. 5, the accommodating portion 662 of the present embodiment is a hole which has a rectangular tube shape and which pierces the second cylindrical portion 660 in the front-rear direction. As shown in FIG. 16, a front end of the accommodating portion 662 is coupled with the rear end of the substantially rectangular half-tube of the cover portion 650. Specifically, the accommodating portion 662 of the second cylindrical portion 660 and the substantially rectangular half-tube of the cover portion 650 form a space which accommodates the optical module 500.

Referring to FIG. 16, each of the O-rings 663, 664 and 665 of the present embodiment has an annular shape which is centered on the axis AX. Each of the O-rings 663, 664 and 665 is arranged on an outer circumferential surface of the second cylindrical portion 660. The O-ring 663 is the frontmost of the O-rings 663, 664 and 665 in the front-rear direction. The O-ring 665 is the rearmost of the O-rings 663, 664 and 665 in the front-rear direction. Specifically, the O-ring 664 is positioned between the O-rings 663 and 665 in the front-rear direction.

As shown in FIGS. 5 and 16, each of the locking portions 666 of the present embodiment is provided on a lower inner wall of the accommodating portion 662. The locking portions 666 fix the optical module 500 to the second holding member 600 by being engaged with the locked portions 530, respectively, of the optical module 500 when the optical module 500 is inserted into the second holding member 600. In other words, the second holding member 600 of the connector 100 of the present embodiment holds the optical module 500.

As shown in FIG. 16, the second protrusion 667 of the present embodiment protrudes outward in the radial direction from the outer circumferential surface of the second cylindrical portion 660. The second protrusion 667 is positioned between the O-rings 663 and 664 in the front-rear direction.

As shown in FIG. 5, the second guide portion 610 of the present embodiment extends rearward from a rear end of the second cylindrical portion 660. The second guide portion 610 comprises two ditches 620 and four wall portions 630. More specifically, the second guide portion 610 has two guide pairs 615 each consisting of the single ditch 620 and two of the wall portions 630. However, the present invention is not limited thereto. The second guide portion 610 may be modified, provided that the second guide portion 610 comprises at least one of the ditch 620 and at least two of the wall portions 630.

As shown in FIG. 15, the guide pairs 615 of the present embodiment correspond to the protruding pieces 320, respectively, of the first guide portion 310 of the first holding member 300. The two guide pairs 615 are spaced apart from each other in the lateral direction. As shown in FIG. 5, in each guide pair 615, the wall portions 630 are arranged opposite to each other with the ditch 620 left therebetween in the up-down direction perpendicular to the front-rear direction. The ditch 620 extends in the front-rear direction. The ditch 620 opens rearward in the front-rear direction. The ditch 620 is recessed inward in the lateral direction. The ditch 620 has two wall surfaces 622, 624 and a side surface 626. Each of the wall surfaces 622, 624 is perpendicular to the up-down direction. The side surface 626 intersects with the lateral direction. Specifically, in each ditch 620, the side surface 626 connects inner ends in the lateral direction of the two wall surfaces 622, 624 with each other. As understood from FIGS. 17 and 18, when the second holding member 600 is mated with the first holding member 300, the ditches 620 receive the protruding pieces 320, respectively, of the first guide portion 310. Meanwhile, the wall surface 622, which is positioned at an upper side of the ditch 620, faces the upper surface 322 of the corresponding protruding piece 320 in the up-down direction while the wall surface 624, which is positioned at a lower side of the ditch 620, faces the lower surface 324 of the corresponding protruding piece 320 in the up-down direction. Also meanwhile, the side surface 626 of the ditch 620 faces the inner surface 328 of the corresponding protruding piece 320 in the lateral direction. However, the present invention is not limited thereto. But, at least two of the wall portions 630 should be arranged opposite to each other with the at least one of the ditch 620 left therebetween in the up-down direction perpendicular to the front-rear direction. In addition, at least one of the ditch 620, which extends in the front-rear direction while opening rearward in the front-rear direction, at least in part, should receive at least one of the protruding piece 320.

As described above, the connector 100 of the present embodiment is configured so that the protruding pieces 320 of the first guide portion 310 of the first holding member 300 are received in the ditches 620, respectively, which are of the second guide portion 610 of the second holding member 600 and each of which opens rearward. Accordingly, a relative movement of the first holding member 300 with respect to the second holding member 600 in the front-rear direction is allowed while a relative movement of the first holding member 300 with respect to the second holding member 600 in the circumferential direction S is regulated. Specifically, in cooperation with each other, the first guide portion 310 and the second guide portion 610 allow the relative movement of the first holding member 300 with respect to the second holding member 600 in the front-rear direction while regulating the relative movement of the first holding member 300 with respect to the second holding member 600 in the circumferential direction S about the axis AX parallel to the front-rear direction.

Figure 13:
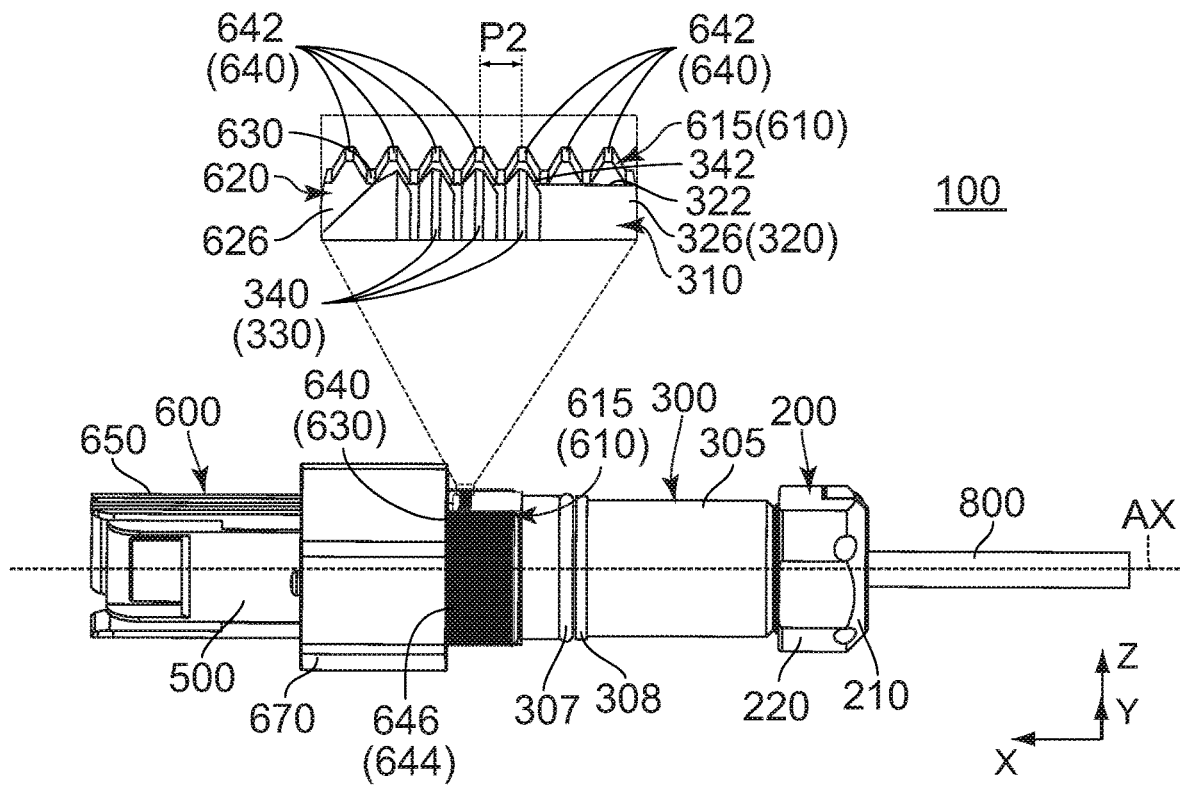
FIG. 13 is a view showing the connector of FIG. 11. In the figure, the first male screw portion and the second male screw portion are partially enlarged.
Figure 14:
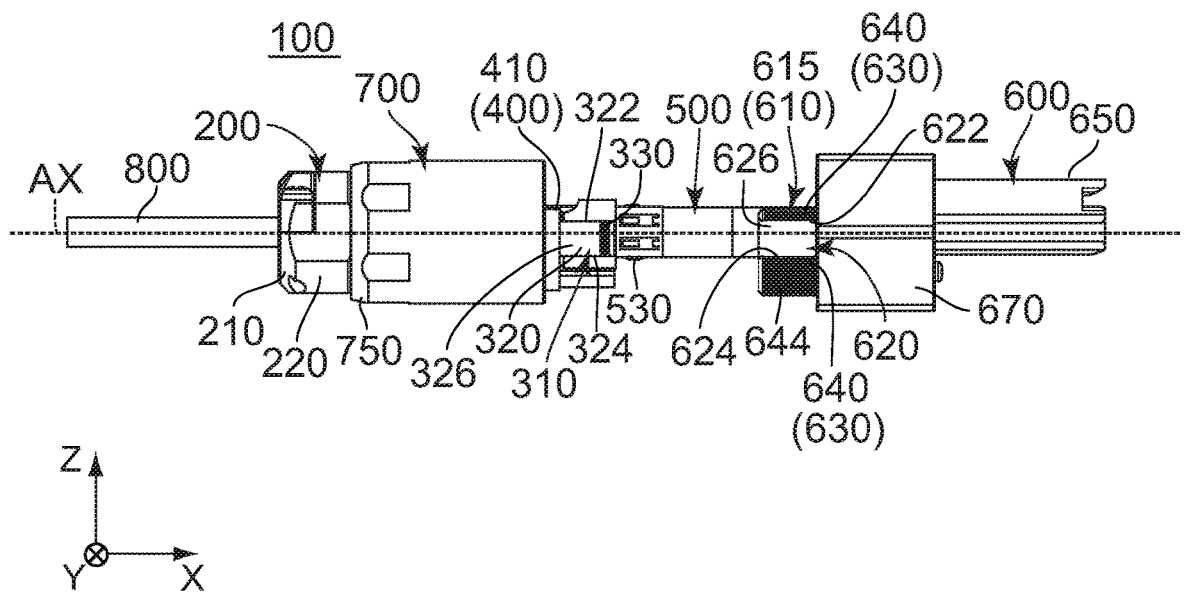
FIG. 14 is a side view for use in explaining a procedure of replacing the optical module of the connector of FIG. 1. In the figure, the protruding pieces of the first guide portion of the first holding member are not inserted into the ditches of the second guide portion of the second holding member.
Figure 17:
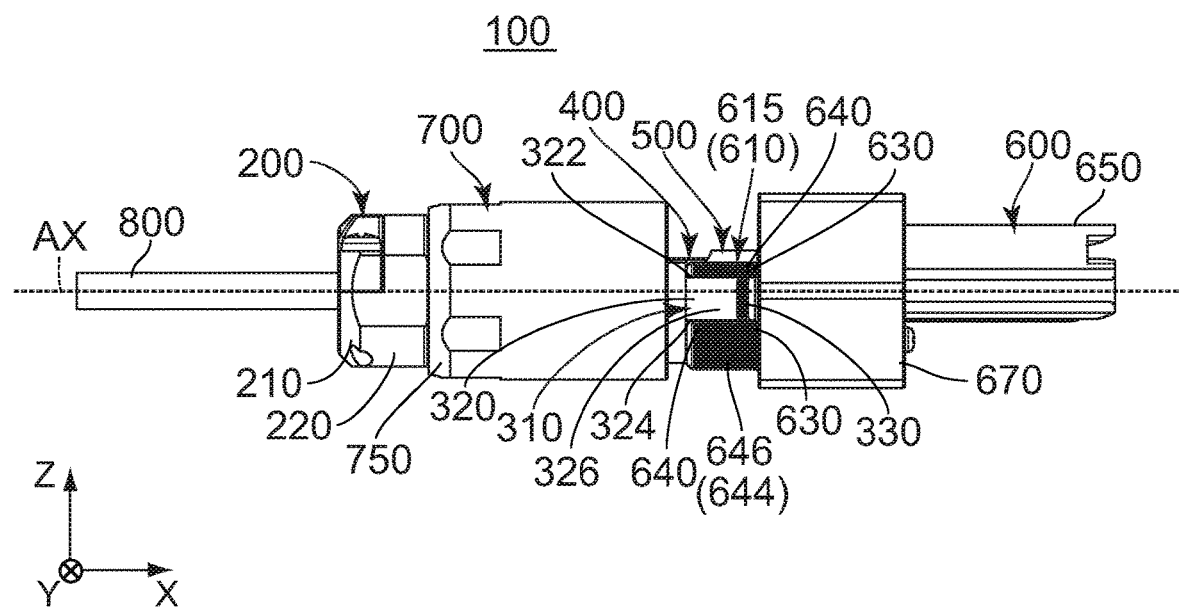
FIG. 17 is another side view for use in explaining the procedure of replacing the optical module of the connector of FIG. 1. In the figure, the protrusion pieces of the first guide portion of the first holding member are inserted into the ditches, respectively, of the second guide portion of the second holding member while the female screw portion of the coupling nut is not meshed with any of the first male screw portion of the first holding member and the second male screw portion of the second holding member.
Figure 18:
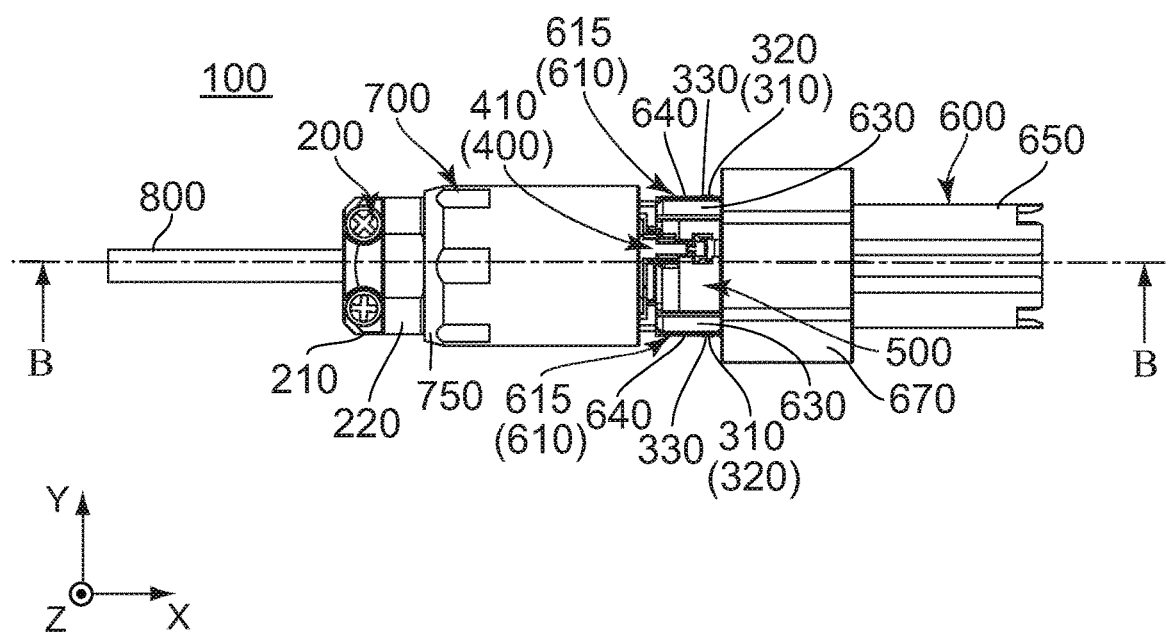
FIG. 18 is a top view showing the connector of FIG. 17.

As shown in FIG. 5, the second male screw portions 640 of the present embodiment are formed on the wall portions 630, respectively. Screw threads 642 of the second male screw portion 640 protrude outward in the radial direction. As shown in FIG. 13, the screw threads 642 of the second male screw portion 640 are arranged at pitches P2 in the front-rear direction. As shown in FIG. 17, a position of the first male screw portion 330 matches a position of the second male screw portion 640 in the front-rear direction under a state where the protruding piece 320 of the first guide portion 310 is received in the ditch 620. More specifically, the first male screw portion 330 of the protruding piece 320 is positioned between the screw thread 642, which is the frontmost of the screw threads 642, and the screw thread 642, which is the rearmost of the screw threads 642, of the second male screw portion 640 of the wall portion 630 of the corresponding guide pair 615 in the front-rear direction. Specifically, in the front-rear direction, a size of the first male screw portion 330 is smaller than a size of the second male screw portion 640. The first male screw portion 330 of the protruding piece 320 is positioned between the second male screw portions 640 of the wall portions 630 of the corresponding guide pair 615 in the up-down direction.

As shown in FIG. 5, the third male screw portion 644 of the present embodiment has a substantially half-cylindrical shape which extends in the front-rear direction. The third male screw portion 644 extends rearward from the rear end of the second cylindrical portion 660. In the lateral direction, the third male screw portion 644 is positioned between the wall portion 630, which is positioned at a lower side of one of the guide pairs 615, and the wall portion 630 which is positioned at a lower side of a remaining one of the guide pairs 615. In other words, the third male screw portion 644 couples the wall portions 630, which are positioned at the lower sides of the two guide pairs 615, with each other in the lateral direction. Screw threads 646 of the third male screw portion 644 are coupled with the screw threads 642 of the second male screw portion 640 in the circumferential direction S.

As shown in FIGS. 3 and 5, the outer tubular portion 670 of the present embodiment has a shape which is rotationally symmetric with respect to the axis AX. More specifically, the outer tubular portion 670 of the present embodiment has a polygonal tubular shape which is centered on the axis AX and which extends in the front-rear direction. The outer tubular portion 670 is formed to have a radial size greater than a radial size of the second cylindrical portion 660. Specifically, the outer tubular portion 670 is positioned outward of the second cylindrical portion 660 in the radial direction. An inner circumferential surface of the outer tubular portion 670 and the outer circumferential surface of the second cylindrical portion 660 form a substantially annular space which extends in the front-rear direction. As shown in FIG. 16, the outer tubular portion 670 has a protrusion 672 which protrudes inward in the radial direction from its inner circumferential surface. The protrusion 672 of the outer tubular portion 670 is positioned rearward of the second protrusion 667 of the second cylindrical portion 660 in the front-rear direction.

As shown in FIG. 2, the coupling nut 700 of the present embodiment has a shape which is rotationally symmetric with respect to the axis AX. More specifically, the coupling nut 700 of the present embodiment has a substantially cylindrical shape which is centered on the axis AX and which extends in the front-rear direction. As shown in FIG. 16, the coupling nut 700 is positioned outward of the first holding member 300 in the radial direction.

Figure 21:
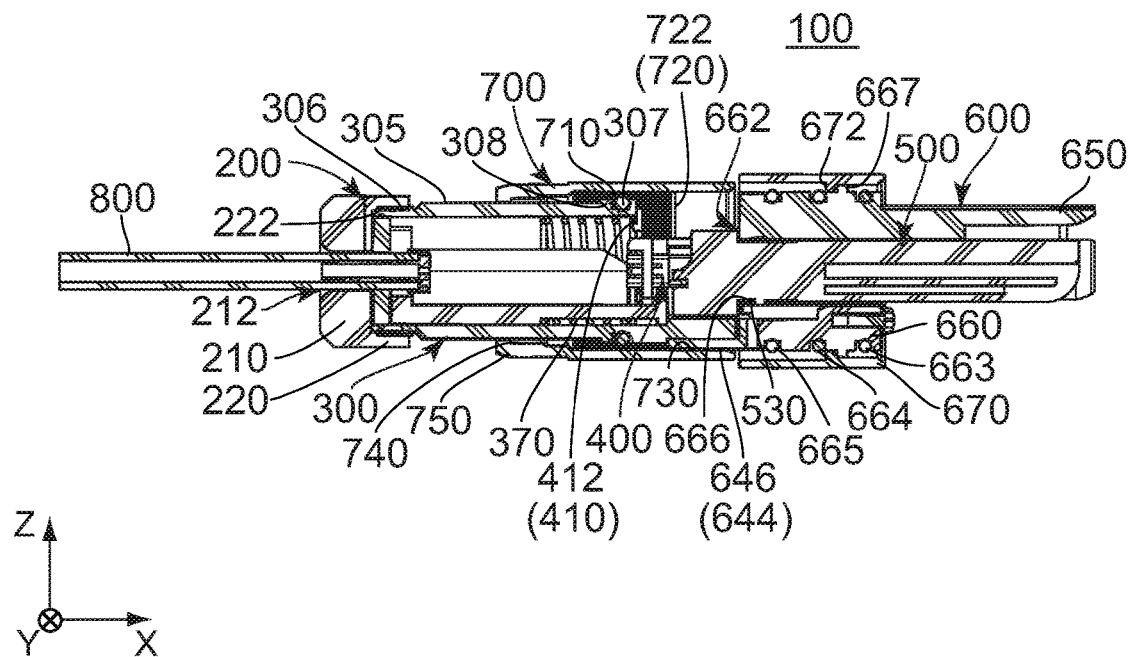
FIG. 21 is a cross-sectional view showing the connector of FIG. 20, taken along line C-C.
Figure 22:
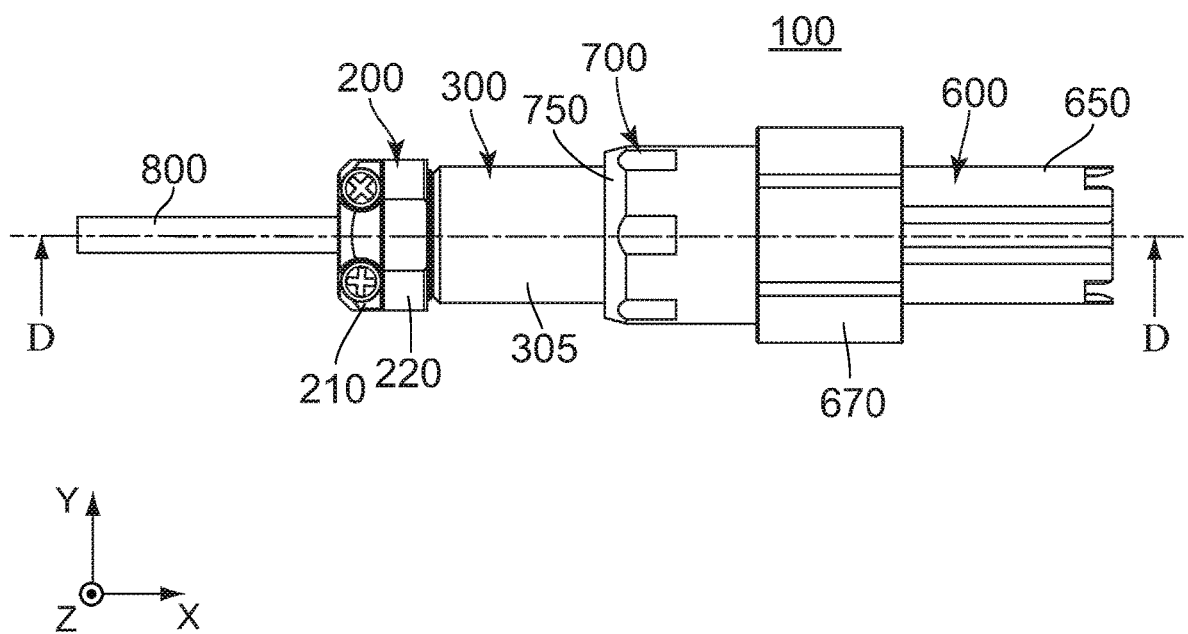
FIG. 22 is another top view for use in explaining the procedure of replacing the optical module of the connector of FIG. 1. In the Figure, the female screw portion of the coupling nut is meshed with both of the first male screw portion of the first holding member and the second male screw portion of the second holding member.

As shown in FIG. 21, the coupling nut 700 of the present embodiment has a first contact portion 730, a female screw portion 710, a second contact portion 740 and a smaller diameter portion 750.

Figure 23:
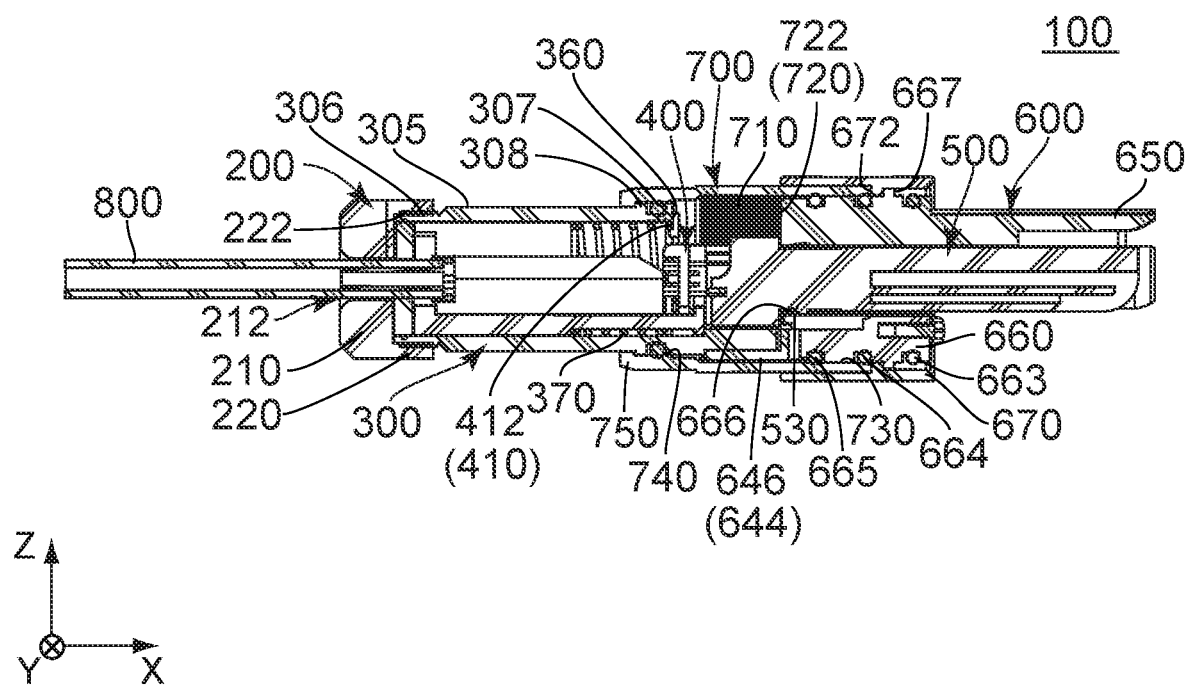
FIG. 23 is a cross-sectional view showing the connector of FIG. 22, taken along line D-D.
Figure 24:
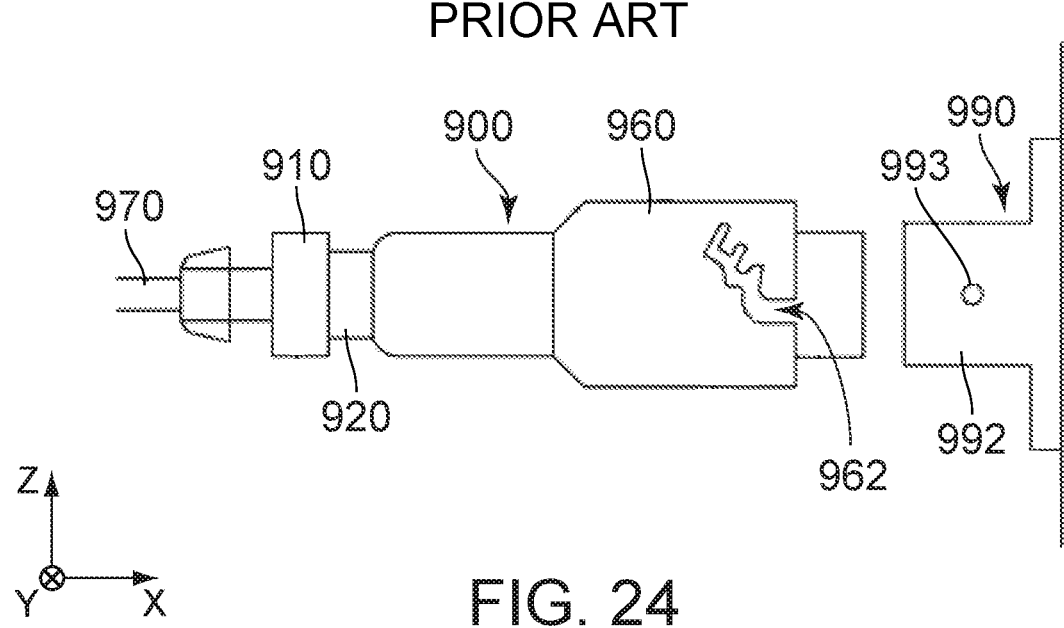
FIG. 24 is a side view showing a connector and an adaptor of Patent Document 1.
Figure 25:
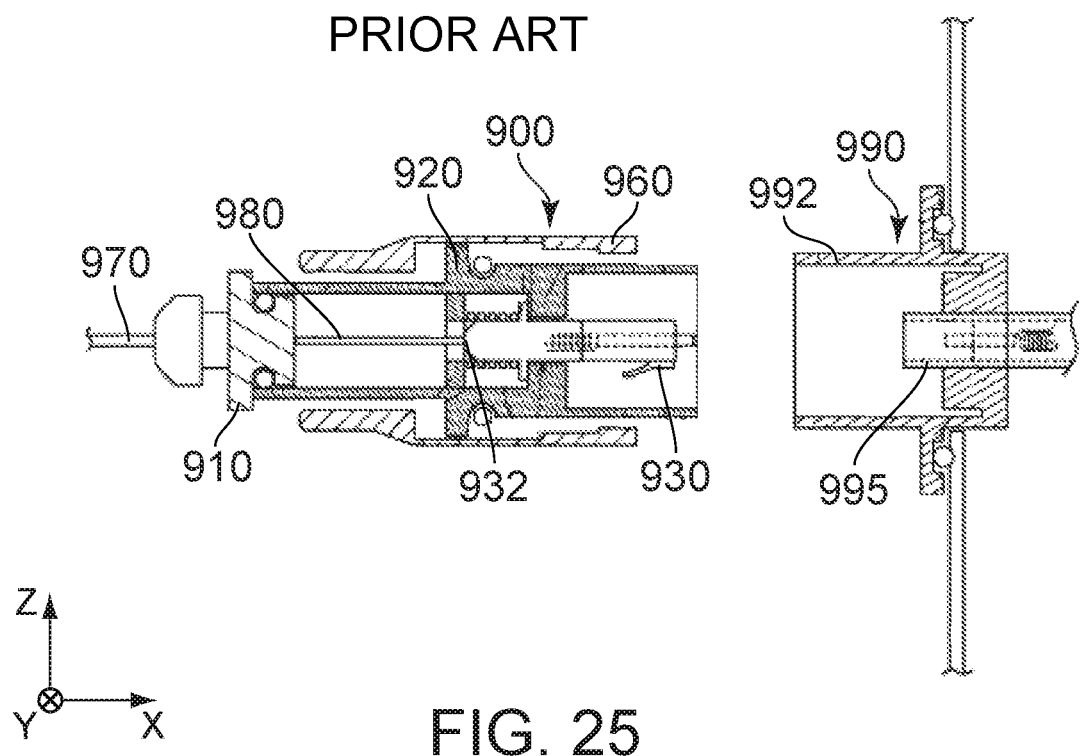
FIG. 25 is a cross-sectional view showing the connector and the adaptor of FIG. 24.

As shown in FIG. 23, the first contact portion 730 of the present embodiment is a part of an inner circumferential surface of the coupling nut 700. The first contact portion 730 is positioned around a front end of the coupling nut 700. When the female screw portion 710 of the coupling nut 700 is meshed with both of the first male screw portion 330 of the first holding member 300 and the second male screw portion 640 of the second holding member 600, the first contact portion 730 is accommodated in the substantially annular space which is formed by the inner circumferential surface of the outer tubular portion 670 and the outer circumferential surface of the second cylindrical portion 660. Meanwhile, the first contact portion 730 is in contact with both of the O-rings 664 and 665 of the second cylindrical portion 660 of the second holding member 600 in the radial direction.

As shown in FIG. 21, the female screw portion 710 of the present embodiment is positioned rearward of the first contact portion 730 in the front-rear direction. Screw threads 720 of the female screw portion 710 protrude inward in the radial direction from the inner circumferential surface of the coupling nut 700. Referring to FIG. 16, the screw threads 720 of the female screw portion 710 are arranged at pitches P3 in the front-rear direction. Referring to FIGS. 16, 13 and 10, the pitch P3 of the screw threads 720 of the female screw portion 710 is equal to any of the pitch P1 of the screw threads 340 of the first male screw portion 330 and the pitch P2 of the screw threads 642 of the second male screw portion 640. As described above, the extending portion 410 of the optical connector 400 is movable by the predetermined distance PD between the front regulating portion 350 and the rear regulating portion 360 of the first holding member 300. Referring to FIGS. 9 and 16, the predetermined distance PD is greater than the pitch P3 of the female screw portion 710.

Referring to FIG. 23, when the female screw portion 710 of the coupling nut 700 is meshed with both of the first male screw portion 330 of the first holding member 300 and the second male screw portion 640 of the second holding member 600, the relative movements of the first holding member 300 and the second holding member 600 in the front-rear direction are prevented by the screw threads 720 of the female screw portion 710. In other words, relative positions of the first holding member 300 and the second holding member 600 in the front-rear direction are maintained by the female screw portion 710 being meshed with both of the first male screw portion 330 of the first holding member 300 and the second male screw portion 640 of the second holding member 600. When the female screw portion 710 is meshed with both the first male screw portion 330 of the first holding member 300 and the second male screw portion 640 of the second holding member 600, the position of the first male screw portion 330 matches the position of the second male screw portion 640 in the front-rear direction. However, the present invention is not limited thereto. But, the position of the first male screw portion 330 should overlap with the position of second male screw portion 640 in the front-rear direction when the female screw portion 710 is meshed with both of the first male screw portion 330 and the second male screw portion 640.

As shown in FIG. 23, the second contact portion 740 of the present embodiment is a part of the inner circumferential surface of the coupling nut 700. The second contact portion 740 is positioned rearward of the female screw portion 710 in the front-rear direction. When the female screw portion 710 of the coupling nut 700 is meshed with both of the first male screw portion 330 of the first holding member 300 and the second male screw portion 640 of the second holding member 600, the second contact portion 740 is in contact with the O-ring 307 of the first cylindrical portion 305 of the first holding member 300 in the radial direction.

As described above, the first contact portion 730 and the second contact portion 740 of the coupling nut 700 are in contact with the outer circumferential surface of the first cylindrical portion 305 of the first holding member 300 and the outer circumferential surface of the second cylindrical portion 660 of the second holding member 600 via the O-rings 307, 664 and 665 when the female screw portion 710 of the coupling nut 700 is meshed with both of the first male screw portion 330 of the first holding member 300 and the second male screw portion 640 of the second holding member 600. Accordingly, the connecting part of the optical connector 400 and the optical module 500, which is positioned between the first cylindrical portion 305 and the second cylindrical portion 660, is shielded from the outside of the connector 100. Specifically, the connecting part of the optical connector 400 and the optical module 500 is waterproofed from the outside of the connector 100.

As shown in FIG. 23, the smaller diameter portion 750 of the present embodiment is positioned at a rear end of the coupling nut 700. The smaller diameter portion 750 protrudes inward in the radial direction from the inner circumferential surface of the coupling nut 700. The smaller diameter portion 750 is positioned rearward of the second contact portion 740 in the front-rear direction. The smaller diameter portion 750 is positioned rearward of the first protrusion 308 of the first cylindrical portion 305 of the first holding member 300 in the front-rear direction. When the female screw portion 710 of the coupling nut 700 is meshed with both of the first male screw portion 330 of the first holding member 300 and the second male screw portion 640 of the second holding member 600, a front surface of the smaller diameter portion 750 faces a rear surface of the first protrusion 308 of the first cylindrical portion 305 of the first holding member 300 in the front-rear direction.

Referring to FIG. 23, the connector 100 of the present embodiment is configured so that the second holding member 600, which holds the optical module 500 having a greater size in the front-rear direction, is positioned farther away from the first holding member 300 in the front-rear direction than the second holding member 600 which holds the optical module 500 having a smaller size in the front-rear direction. Specifically, the connector 100 of the present embodiment is configured so that a size difference of the optical modules 500 in the front-rear direction is negated by a positional difference of the second holding member 600 with respect to the first holding member 300 in the front-rear direction. Accordingly, the optical fiber cable 800 can have a constant length between the optical connector 400 and the cable holding portion 200, and thereby the optical fiber cable 800 can be prevented from having an excess length to be bent in the connector 100 even if the optical module 500 is replaced with another optical module 500 having a different size in the front-rear direction.

Hereinafter, description will be made about a method of replacing the optical module 500 in the connector 100 of the present embodiment.

First, in the connector 100 shown in FIG. 1, the coupling nut 700 is rotated in the second rotation direction R2 of the circumferential direction S with respect to both the first holding member 300 and the second holding member 600. Then, the female screw portion 710 of the coupling nut 700 is unmeshed from both of the first male screw portion 330 of the first holding member 300 and the second male screw portion 640 of the second holding member 600. Specifically, the coupling nut 700 is movable rearward of any of the first male screw portion 330 of the first holding member 300 and the second male screw portion 640 of the second holding member 600.

When the second holding member 600, which holds the optical module 500, is moved forwardly away from the first holding member 300 under this state, the optical connector 400 and the optical module 500 are unconnected from each other so that the connector 100 reaches a state shown in FIG. 2. In the state shown in FIG. 2, the optical module 500 is removed from the second holding member 600 by being pulled rearward therefrom.

After that, a new optical module 500 is attached with the optical connector 400, which is held by the first holding member 300, so that the connector 100 reaches a state shown in FIG. 3. When the second holding member 600 is moved rearward with respect to the optical module 500 in the state shown in FIG. 3 so that the optical module 500 is inserted into the accommodating portion 662 of the second cylindrical portion 660 from a rear end of the accommodating portion 662, the second holding member 600 is mated with the first holding member 300. Thus, the locking portions 666 (see FIG. 16) of the second holding member 600 are engaged with the locked portions 530 (see FIG. 16), respectively, of the optical module 500 and thereby the optical module 500 is fixed to the second holding member 600.

Figure 19:
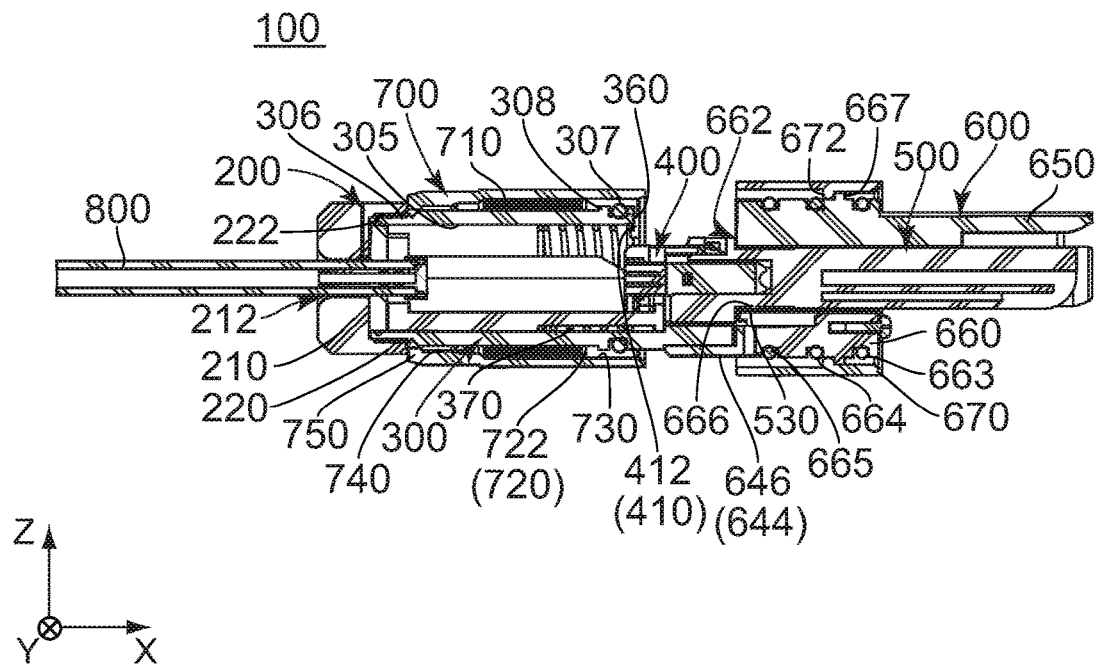
FIG. 19 is a cross-sectional view showing the connector of FIG. 18, taken along line B-B.
Figure 20:
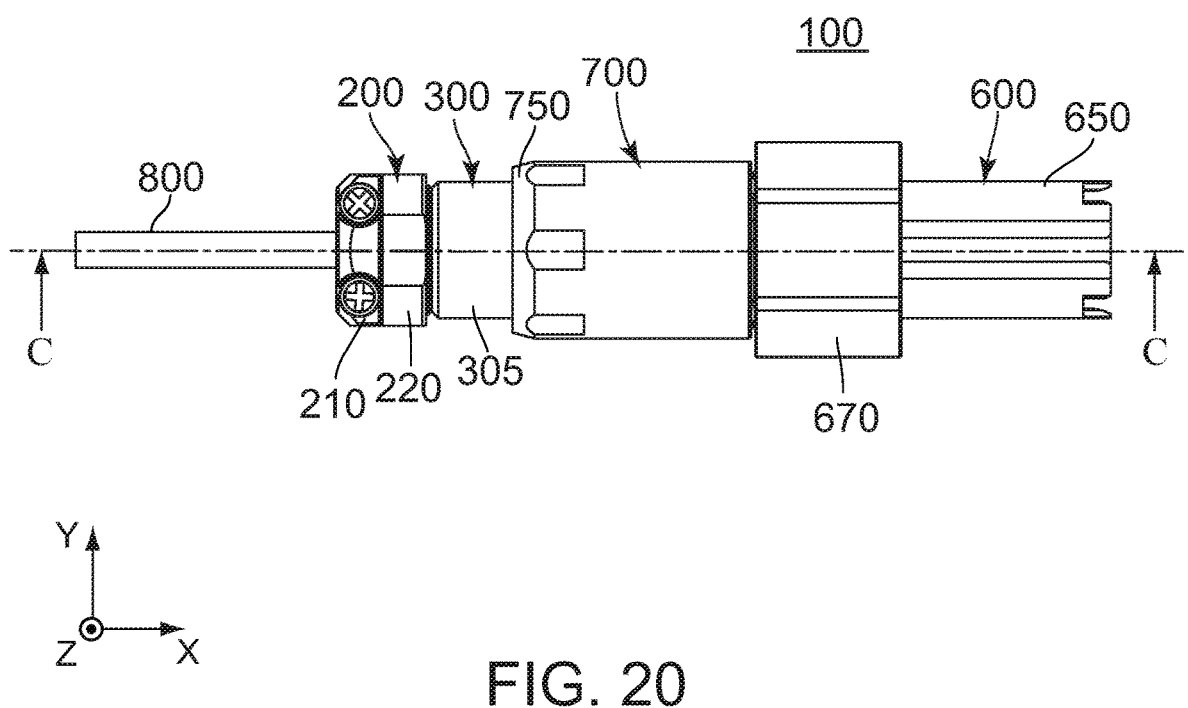
FIG. 20 is a top view for use in explaining the procedure of replacing the optical module of the connector of FIG. 1. In the figure, the protruding pieces of the first guide portion of the first holding member are inserted into the ditches, respectively, of the second guide portion of the second holding member and the female screw portion of the coupling nut is meshed with the second male screw portion of the second holding member and the female screw portion of the coupling nut is not meshed with the first male screw portion of the first holding member.

Specifically, the connector 100 reaches a state shown in FIG. 19. However, the present invention is not limited thereto. The connector 100 may reach the state shown in FIG. 19 as follows: a new optical module 500 is fixed to the second holding member 600; and the second holding member 600, to which the new optical module 500 is fixed, approaches the first holding member 300.

Referring to FIGS. 8 and 20 to 23, when the coupling nut 700 is moved forward with respect to both of the first holding member 300 and the second holding member 600 while being rotated in the first rotation direction R1 of the circumferential direction S with respect to both of the first holding member 300 and the second holding member 600, the female screw portion 710 of the coupling nut 700 is meshed with the second male screw portions 640 of the wall portions 630 of the second guide portion 610 of the second holding member 600 and is then meshed with the first male screw portions 330 of the protruding pieces 320 of the first guide portion 310 of the first holding member 300.

Referring to FIGS. 10 and 13, if the female screw portion 710 of the coupling nut 700 and the first male screw portion 330 of the first holding member 300 are deviated from each other in the front-rear direction upon the meshing thereof, the deviation of the female screw portion 710 and the first male screw portion 330 in the front-rear direction is eliminated as follows; when the female screw portion 710, which is meshed with the second male screw portion 640 of the second holding member 600, begins to be meshed with the first male screw portion 330, a leading end 722 (see FIG. 16) of the screw thread 720 of the female screw portion 710 abuts against the intersecting surface 342 of the screw thread 340 of the first male screw portion 330 to move the first male screw portion 330 in the front-rear direction.

More specifically, referring to FIG. 10, if the female screw portion 710 of the coupling nut 700 and the first male screw portion 330 of the first holding member 300 are deviated from each other in the front-rear direction upon the meshing thereof, the deviation of the female screw portion 710 and the first male screw portion 330 in the front-rear direction is eliminated as follows. When the female screw portion 710, which is meshed with the second male screw portion 640 of the second holding member 600, begins to be meshed with the first male screw portion 330, the leading end 722 (see FIG. 16) of the screw thread 720 of the female screw portion 710 abuts against the intersecting surface 342 of the screw thread 340 of the first male screw portion 330 to apply a force, which is directed in the first rotation direction R1, to the intersecting surface 342. Since the intersecting surface 342 is inclined so as to extend forward and upward as described above, the force directed in the first rotation direction R1, which is applied to the intersecting surface 342, is converted to a forward force. In addition, the first holding member 300 is movable forward by the predetermined distance PD with respect to the optical connector 400 as described above. Accordingly, referring to FIG. 13, the first male screw portion 330 is moved forward until the female screw portion 710 and the first male screw portion 330 are positioned at the same position as each other in the front-rear direction. In other words, the deviation of the female screw portion 710 and the first male screw portion 330 in the front-rear direction is eliminated.

When the coupling nut 700 continues to be rotated in the first rotation direction R1 with respect to both of the first holding member 300 and the second holding member 600 under a state where the deviation is eliminated, the female screw portion 710 is meshed with both of the first male screw portion 330 and the second male screw portion 640.

As described above, a size difference of optical modules 500 in the front-rear direction is negated by a positional difference of the second holding member 600 with respect to the first holding member 300 in the front-rear direction in the connector 100 of the present embodiment when the optical module 500 is replaced with another optical module 500 having a different size in the front-rear direction. Accordingly, the optical fiber cable 800 can have a constant length between the optical connector 400 and the cable holding portion 200. Thus, the optical fiber cable 800 can be prevented from having an excess length to be bent in the connector 100 even if the optical module 500 is replaced with another optical module 500 having a different size in the front-rear direction.

Although the specific explanation about the present invention is made above referring to the embodiments, the present invention is not limited thereto and is susceptible to various modifications and alternative forms.

Although the first guide portion 310 of the present embodiment has the two protruding pieces 320 while the second guide portion 610 of the present embodiment has the two guide pairs 615, the present invention is not limited thereto. The connector 100 may be configured, for example, as follows; the first guide portion 310 has a protruding piece 320 with a half-cylindrical shape, the second guide portion 610 has a guide pair 615 with a half-cylindrical shape, and combination of the half-cylindrical shapes of the protruding piece 320 and the guide pair 615 forms a single cylinder.

Although the first male screw portion 330 of the present embodiment is formed on the first guide portion 310 while the second male screw portion 640 of the present embodiment is formed on the second guide portion 610, the present embodiment is not limited thereto. For example, the first male screw portion 330 may be formed on the first cylindrical portion 305, and the second male screw portion 640 may be formed on the second cylindrical portion 660.

Although the connector 100 of the present embodiment is configured so that the position of the first male screw portion 330 matches the position of the second male screw portion 640 in the front-rear direction when the female screw portion 710 of the coupling nut 700 is meshed with both of the first male screw portion 330 of the first holding member 300 and the second male screw portion 640 of the second holding member 600, the present invention is not limited thereto. Specifically, the position of the first male screw portion 330 may not overlap with the position of the second male screw portion 640 in the front-rear direction when the female screw portion 710 of the coupling nut 700 is meshed with both of the first male screw portion 330 of the first holding member 300 and the second male screw portion 640 of the second holding member 600.

The present application is based on a Japanese patent application of JP2018-068775 filed before the Japan Patent Office on Mar. 30, 2018, the content of which is incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

REFERENCE SIGNS LIST 100 connector
200 cable holding portion
210 disc-like portion 212 hole
220 tube portion
222 female screw
300 first holding member
305 first cylindrical portion
306 male screw
307 O-ring
308 first protrusion
310 first guide portion
320 protruding piece
322 upper surface
324 lower surface
326 outer surface
328 inner surface
330 first male screw portion
340 screw thread
342 intersecting surface
350 front regulating portion
360 rear regulating portion
370 pressing member (spring member)
400 optical connector
401 optical connector main
402 pressed portion
403 optical fiber cable accommodating portion
404 supporting portion
406 receiving portion
407 hook portion
408 front surface
409 engaging portion
410 extending portion
411 hole
412 rear surface
414 abutting portion
416 front regulated portion
418 rear regulated portion
500 optical module
510 photoelectric conversion portion
520 electrical connector
530 locked portion
540 engaged portion
600 second holding member
610 second guide portion
615 guide pair
620 ditch
622 wall surface
624 wall surface
626 side surface
630 wall portion
640 second male screw portion
642 screw thread
644 third male screw portion
646 screw thread
650 cover portion
660 second cylindrical portion
662 accommodating portion
663 O-ring
664 O-ring
665 O-ring
666 locking portion
667 second protrusion
670 outer tubular portion
672 protrusion
700 coupling nut
710 female screw portion
720 screw thread
722 leading end
730 first contact portion
740 second contact portion
750 smaller diameter portion
800 optical fiber cable
AX axis
P1 pitch
P2 pitch
P3 pitch
PD predetermined distance
R1 first rotation direction
R2 second rotation direction
S circumferential direction

The invention claimed is:
1. A connector comprising:
a cable holding portion,
a first holding member,
an optical connector,
an optical module,
a second holding member, and
a coupling nut,
wherein:
the cable holding portion is configured to hold an optical fiber cable which transmits optical signals;
the cable holding portion is attached with the first holding member;
the first holding member holds the optical connector;
the first holding member has a first male screw portion and a first guide portion;
the optical connector is configured to be attached with the optical fiber cable;
the optical module is connected with the optical connector;
the optical module comprises a photoelectric conversion portion and an electrical connector;
the second holding member is positioned forward of the first holding member in a front-rear direction;
the second holding member holds the optical module;
the second holding member has a second male screw portion and a second guide portion;
in cooperation with each other, the first guide portion and the second guide portion allow a relative movement of the first holding member with respect to the second holding member in the front-rear direction while regulating a relative movement of the first holding member with respect to the second holding member in a circumferential direction about an axis parallel to the front-rear direction;
the coupling nut has a female screw portion;
relative positions of the first holding member and the second holding member in the front-rear direction are maintained by the female screw portion being meshed with both of the first male screw portion and the second male screw portion;
the first guide portion comprises at least one protruding piece;
the at least one protruding piece extends forward in the front-rear direction;
the second guide portion comprises at least one ditch and at least two wall portions;
the at least two wall portions are arranged opposite to each other with the at least one ditch left therebetween in an up-down direction perpendicular to the front-rear direction;
the at least one ditch extends in the front-rear direction and opens rearward in the front-rear direction;
the at least one ditch, at least in part, accommodates the at least one protruding piece;

the ditch is recessed inward in a lateral direction perpendicular to both the front-rear direction and the up-down direction;
the ditch has two wall surfaces and a side surface;
each of the wall surfaces is perpendicular to the up-down direction; and
the side surface intersects with the lateral direction.

2. The connector as recited in claim 1, wherein:
the at least one protruding piece includes two of the protruding pieces;
the at least one ditch includes two of the ditches;
the ditches receive the protruding pieces, respectively; and
the optical connector is positioned between the two protruding pieces in the lateral direction.

3. The connector as recited in claim 1, wherein the first male screw portion is provided on the at least one protruding piece.

4. The connector as recited in claim 1, wherein the second male screw portion is formed on the wall portions.

5. The connector as recited in claim 1, wherein, when the female screw portion is meshed with both of the first male screw portion and the second male screw portion, a position of the first male screw portion overlaps with a position of the second male screw portion in the front-rear direction.

6. The connector as recited in claim 1, wherein the first holding member holds the optical connector so that the optical connector is movable in the front-rear direction.

7. The connector as recited in claim 6, wherein:
the optical connector has an extending portion which is perpendicular to the front-rear direction;
the first holding member has a front regulating portion and a rear regulating portion;
the extending portion is positioned between the front regulating portion and the rear regulating portion in the front-rear direction; and
the extending portion is movable by a predetermined distance between the front regulating portion and the rear regulating portion.

8. The connector as recited in claim 7, wherein:
the female screw portion has a pitch; and
the predetermined distance is greater than the pitch of the female screw portion.

9. The connector as recited in claim 7, wherein the first holding member further comprises a pressing member which presses the extending portion against the front regulating portion.

10. The connector as recited in claim 9, wherein:
the pressing member is a spring member which is accommodated in the first holding member; and
the spring member presses the extending portion forward in the front-rear direction.

11. The connector as recited in claim 6, wherein:
the female screw portion is meshed with both of the first male screw portion and the second male screw portion by the coupling nut being rotated with respect to both of the first holding member and the second holding member in a first rotation direction of the circumferential direction;
the first male screw portion has a screw thread;
the screw thread of the first male screw portion has an intersecting surface;
the intersecting surface is positioned at an end of the screw thread of the first male screw portion in a second rotation direction of the circumferential direction;
the second rotation direction is opposite to the first rotation direction;
the intersecting surface intersects with the first rotation direction;
the female screw portion has a screw thread;
the screw thread of the female screw portion has a leading end; and
if the female screw portion and the first male screw portion are deviated from each other in the front-rear direction upon the meshing thereof, the deviation is eliminated by the leading end of the screw thread of the female screw portion abutting against the intersecting surface to move the first male screw portion in the front-rear direction when the female screw portion, which is meshed with the second male screw portion, begins to be meshed with the first male screw portion.

* * * * *